(12) United States Patent  
Sun

(10) Patent No.: US 9,172,248 B2
(45) Date of Patent: Oct. 27, 2015

(54) CASCADED CONVERTER STATION AND CASCADED MULTI-TERMINAL HVDC POWER TRANSMISSION SYSTEM

(75) Inventor: Xin Sun, Beijing (CN)

(73) Assignee: State Grid Corporation of China, Beijing (CN)

( * ) Notice: Subject to any disclaimer, the term of this patent is extended or adjusted under 35 U.S.C. 154(b) by 254 days.

(21) Appl. No.: 13/991,644

(22) PCT Filed: Dec. 9, 2010

(86) PCT No.: PCT/CN2010/002001
§ 371 (c)(1),
(2), (4) Date: Aug. 20, 2013

(87) PCT Pub. No.: WO2012/075610
PCT Pub. Date: Jun. 14, 2012

(65) Prior Publication Data
US 2013/0322131 A1    Dec. 5, 2013

(51) Int. Cl.
*H02J 3/36* (2006.01)
*H02M 5/458* (2006.01)

(52) U.S. Cl.
CPC ... *H02J 3/36* (2013.01); *Y02E 60/60* (2013.01)

(58) Field of Classification Search
CPC ....... H02J 3/36; H02M 5/4585; H02M 5/458; H02M 5/453; H02M 5/40
USPC ............. 363/34, 35, 37; 307/82, 83, 84
See application file for complete search history.

(56) References Cited

U.S. PATENT DOCUMENTS

| | | | | |
|---|---|---|---|---|
| 4,019,115 A | * | 4/1977 | Lips | 363/65 |
| 4,308,575 A | * | 12/1981 | Mase | 363/48 |
| 4,648,018 A | * | 3/1987 | Neupauer | 363/35 |
| 8,014,178 B2 | | 9/2011 | Radbrant | |
| 8,300,435 B2 | * | 10/2012 | Bjorklund et al. | 363/35 |
| 2009/0316446 A1 | * | 12/2009 | Astr m et al. | 363/35 |
| 2010/0046255 A1 | * | 2/2010 | Paajarvi | 363/35 |

FOREIGN PATENT DOCUMENTS

| CN | 1848575 A | 10/2006 |
|---|---|---|
| CN | 101295000 A | 10/2008 |

(Continued)

OTHER PUBLICATIONS

International Search Report and Written Opinion mailed Aug. 25, 2011, issued in corresponding International Application No. PCT/CN2010/002001, filed Dec. 9, 2010, 10 pages.

International Preliminary Report on Patentability mailed Feb. 21, 2013, issued in corresponding International Application No. PCT/CN2010/002001, filed Dec. 9, 2010, 21 pages.

(Continued)

*Primary Examiner* — Gary L Laxton
(74) *Attorney, Agent, or Firm* — Christensen O'Connor Johnson Kindness PLLC

(57) ABSTRACT

A cascade converter station and a multi-end cascade high-voltage direct current (HVDC) power transmission system. The converter station includes a low-voltage end converter station (11) and a high-voltage end converter station (12). The high-voltage end converter station (12) is connected in series with the low-voltage end converter station (11) through a medium-voltage direct current (DC) power transmission line (13) and connected to a HVDC power transmission line (14). With the cascade converter station and the multi-end cascade HVDC power transmission system, HVDC power transmission can be achieved in a flexible, reliable and economical manner.

21 Claims, 27 Drawing Sheets

(56) References Cited

FOREIGN PATENT DOCUMENTS

| | | |
|---|---|---|
| CN | 101297448 A | 10/2008 |
| CN | 101325322 A | 12/2008 |
| CN | 101741082 A | 6/2010 |
| CN | 101882792 A | 11/2010 |
| CN | 102082432 A | 6/2011 |

OTHER PUBLICATIONS

Wang, C., "Research of Operation Modes of ± 80kV Ultra-High Voltage Direct Current Power Transmission System," Science & Technology Information 32:46-47, Nov. 2009. [See Int'l Preliminary Report on Patentability in PCT/CN2010/002001 mailed Feb. 21, 2013.].

* cited by examiner

CASCADED CONVERTER STATION AND CASCADED MULTI-TERMINAL HVDC POWER TRANSMISSION SYSTEM

TECHNICAL FIELD

This invention relates to the field of DC power transmission, and more particularly to a cascaded converter station used in cascaded multi-terminal HVDC power transmission and a cascaded multi-terminal HVDC power transmission system constructed by such cascaded converter stations.

BACKGROUND

With the development of the power and electrical techniques, especially, the development of high-power silicon controlled rectifier (SCR) manufacturing, DC power transmission has gain wider and wider applications in electric power systems. A cascaded multi-terminal HVDC power transmission system is composed of three or above converter stations and a DC power transmission line, wherein more than one converter stations operate as a rectifier station or an inverter station. As compared with a two-terminal HVDC power transmission system, in the following situations, for example, a cascaded multi-terminal HVDC power transmission system may operate in a more economical and flexible manner: collecting electric power from multiple electric power bases (for example, wind farms) located in a large area for outward transmission; transmitting a large amount of electricity from an energy base to several remote load centers; providing access to power supplies or loads on mid-branches of a DC line; realizing asynchronous networking of several independent AC systems through a DC line; for the power transmission of metropolis areas or industrial centers, transmitting power energy to several converter stations through DC power transmission, where cables must be used due to limits on overhead power line corridors, or AC power transmission is unsuitable due to limits on short-circuit capacity.

In a cascaded multi-terminal HVDC power transmission system, it is inevitable for high voltage devices, such as converters, smoothing reactors, DC filters, etc. suffering from the impacts of high voltage, large current, the natural environment and connected AC systems to have failures. In the case of faulty part of the system (such as, a converter on a certain stage), it is desired to cut such part off from the system reliably while keeping other parts of the system operating normally, so as to ensure the safety of the HVDC power transmission system and improve its energy availability.

SUMMARY

This invention is directed to overcome the above problem, and to provide a technique for realizing HVDC power transmission in a flexible, reliable and economical manner.

In order to achieve the above object, according to a first aspect of this invention, a cascaded converter station used in cascaded multi-terminal HVDC power transmission is provided, comprising: a low-voltage end converter station having a positive side and a negative side, each of which comprising a converter transformer coupled to a first alternating current (AC) network; a converter valve coupled to the converter transformer for realizing DC/AC conversion; and smoothing reactors provided on both ends of the converter valve; and a high-voltage end converter station, which is connected in series to the low-voltage end converter station through a middle-voltage DC power transmission line, and is connected to a high-voltage power transmission line, wherein the high-voltage end converter station comprises a positive side and a negative side, each of which comprising a converter transformer coupled to a second alternating current (AC) network; a converter valve coupled to the converter transformer for realizing DC/AC conversion; and smoothing reactors provided on both ends of the converter valve; wherein a grounding line coupled to a grounding electrode and a metal return line coupled between a positive line and a negative line are provided in the low-voltage end converter station.

According to a second aspect of this invention, a cascaded converter station used in cascaded multi-terminal HVDC power transmission is provided, comprising: a low-voltage end converter station comprising a positive side and a negative side, each of which comprising a converter transformer coupled to a first alternating current (AC) network; a converter valve coupled to the converter transformer for realizing DC/AC conversion; and smoothing reactors provided on both ends of the converter valve; and a high-voltage end converter station, which is connected in series to the low-voltage end converter station through a middle-voltage DC power transmission line, and is connected to a high-voltage DC power transmission line, wherein the high-voltage end converter station comprises a positive side and a negative side, each of which comprising a converter transformer coupled to a second alternating current (AC) network; a converter valve coupled to the converter transformer for realizing DC/AC conversion; and smoothing reactors provided on both ends of the converter valve; wherein a grounding line coupled to a grounding electrode and a metal return line coupled between a positive line and a negative line are provided in the low-voltage end converter station, and a grounding line coupled to the grounding electrode is provided in the high-voltage end converter station.

According to a third aspect of this invention, a cascaded converter station used in cascaded multi-terminal HVDC power transmission is provided, comprising: a low-voltage end converter station comprising a positive side and a negative side, each of which comprising a converter transformer coupled to a first alternating current (AC) network; a converter valve coupled to the converter transformer for realizing DC/AC conversion; and smoothing reactors provided on both ends of the converter valve; and a high-voltage end converter station, which is connected in series to the low-voltage end converter station through a middle-voltage DC power transmission line, and is connected to a high-voltage DC power transmission line, wherein the high-voltage end converter station comprises a positive side and a negative side, each of which comprising a converter transformer coupled to a second alternating current (AC) network; a converter valve coupled to the converter transformer for realizing DC/AC conversion; and smoothing reactors provided on both ends of the converter valve; wherein a grounding line coupled to the grounding electrode and a metal return line coupled between a positive line and a negative line are provided in the low-voltage end converter station; a grounding line coupled to the grounding electrode and a neutral bus switch are provided in the high-voltage end converter station.

According to a fourth aspect of this invention, a cascaded converter station used in cascaded multi-terminal HVDC power transmission is provided, comprising: a low-voltage end converter station comprising a positive side and a negative side, each of which comprising a converter transformer coupled to a first alternating current (AC) network; a converter valve coupled to the converter transformer for realizing DC/AC conversion; and smoothing reactors provided on both ends of the converter valve; and a high-voltage end converter station, which is connected in series to the low-voltage end converter station through a middle-voltage DC power transmission line, and is connected to a high-voltage DC power transmission line, wherein the high-voltage end converter station comprises a positive side and a negative side, each of which comprising a converter transformer coupled to a second alternating current (AC) network; a converter valve coupled to the converter transformer for realizing DC/AC conversion; and smoothing reactors provided on both ends of the converter valve; wherein a grounding line coupled to the grounding electrode and a metal return line coupled between a positive line and a negative line are provided in the low-voltage end converter station; a grounding line coupled to the grounding electrode, a neutral bus switch, and a neutral bus isolation knife switch are provided in the high-voltage end converter station, and a path for bypassing the high-voltage end cascaded converter station is coupled between the middle voltage DC power transmission line and the high voltage DC power transmission line.

According to a fifth aspect of this invention, a cascaded multi-terminal HVDC power transmission system is provided, comprising: a sending side converter station, a receiving side converter station, and a high-voltage DC power transmission line therebetween, wherein at least one of the sending side converter station and the receiving side converter station is constructed according to the cascaded converter station of the first to fourth aspects above.

With the cascaded converter station of this invention and the cascaded multi-terminal HVDC power transmission system formed by such cascaded converter stations, because various flexible combinations of a grounding line, a metal return line, a neutral bus device, and an isolation knife switch are provided in the wiring of the cascaded converter station, other parts of the system may continue operation if a failure occurs on a certain part of the system, so that safety of the HVDC power transmission system and its energy availability can be improved. In addition, because smoothing reactors are provided on both sides of the converter valve, the effect of lighting protection can be effectively achieved.

BRIEF DESCRIPTION OF THE SEVERAL VIEWS OF THE DRAWINGS

In order to understand the above features and advantages of this invention more clearly, preferred embodiments of this invention are shown in accompanying drawings in an unrestrictive manner, wherein the same or similar reference labels denote the same or similar components.

DETAILED DESCRIPTION

A detailed description of preferred embodiments of this invention will be given below with reference to the drawings, which are merely illustrative but not limitations on the scope of this invention.

Figure 1:
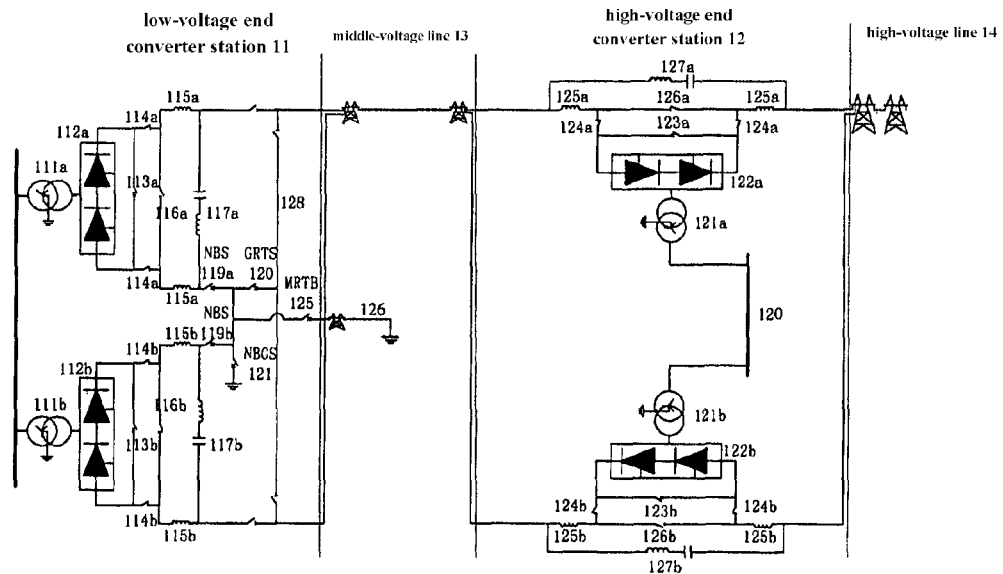
FIG. 1 is a schematic diagram of the structure and wiring of a cascaded converter station used in cascaded multi-terminal HVDC power transmission according to a first embodiment of this invention.

FIG. 1 is a schematic diagram of the structure and wiring of a cascaded converter station used in cascaded multi-terminal HVDC power transmission according to a first embodiment of this invention. For the purpose of simplifying this description, FIG. 1 only shows the sending side of the HVDC power transmission system, that is, a schematic diagram of the rectification side. However, those skilled in the art may understand that the receiving side of the HVDC power transmission system, that is, the inverter side may have substantially the same structure and wiring as that of the sending side, but a converter station on the inverter side in an inverting working condition, and there is a slightly different between the filter configuration with the rectification side.

As shown in FIG. 1, the cascaded converter station according to the first embodiment comprises a low-voltage end converter station 11 and a high-voltage end converter station 12, which may be located at different geographic positions. The high-voltage end converter station 12 is connected to the low-voltage end converter station 11 in series through the middle-voltage DC power transmission line 13. The high-voltage end converter station 12 is further connected to a high-voltage DC power transmission line 14.

The low-voltage end converter station 11 is used to convert an alternating current generated by a first alternating current power supply 110 to a direct current, and input it into the high-voltage end converter station 12 through the middle-voltage DC power transmission line 13. The high-voltage end converter station 12 converts an alternating current generated by a second alternating current power supply 120 to a direct current, and superimpose it with the direct current outputted from the low-voltage end converter station 11 to generate a high-voltage direct current, which is then transmitted to the receiving side, i.e., the inverter side (not shown in FIG. 1) of the HVDC power transmission system through the high-voltage DC power transmission line 14. The first alternating current power supply 110 and the second alternating current power supply 120 may be wind farms located in different locations. Such that, electric energy collected from multiple AC power supplies can be sent out in the DC manner.

The voltage of the high voltage direct current outputted from the high-voltage end converter station 12 may be in a range above ±750 KV, for example, the voltage of the high voltage direct current may be ±800 KV or ±1000 KV. The present description will be given herein with ±800 KV high voltage direct current as an example. In this case, the voltage range of the direct current outputted from the low-voltage end converter station 11 is preferably half of that of the high voltage direct current, that is, ±400 KV. The voltage of the current of the second alternating current power supply 120 rectified by high-voltage end converter station 12 is also ±400 KV, so that the voltage of a high voltage direct current obtained through superimposing the two alternating currents is ±800 KV.

The negative side of the low-voltage end converter station 11 comprises a converter transformer 111a coupled to the first AC power supply 110. The converter transformer 111a is used to change AC voltage and realizes electric isolation between the AC part and the DC part in the power transmission system.

A converter valve 112a is coupled to the converter transformer 111a, which is used to realize AC/DC conversion. In the embodiment of this invention, the converter valve 112a is preferably a 12-pulse converter valve.

On each side of the converter valve 112a, a smoothing reactor 115a is provided. The smoothing reactors 115a are used to smooth DC ripples in DC and prevent DC interruption. The smoothing reactor 115a may also prevent impulse steep waves generated by DC lines or DC devices from entering the valve hall, and thereby prevent over-current damages to the converter valve 112a. Through arranging smoothing reactors 115a on both sides of the converter valve 112a, the effect of lighting protection can be effectively achieved, so that the safety of the power transmission system can be improved.

In the scheme shown in FIG. 1, a DC filter 117a is further connected across the two ends of the smoothing reactors 115a, for filtering out harmonic current generated in the conversion process of the converter valve, so as to prevent interference on the system caused by the harmonic current. According to another optional scheme, isolation knife switches can be provided on both sides of the DC filter 117a.

A bypass isolation knife switch 116a is arranged between the smoothing reactors 115a, for provide a bypass when a failure occurs on the converter valve 112a. A bypass AC switch 113a and isolation knife switches 114a are further provided near the converter valve 112a.

The positive side of the low-voltage end converter station 11 has a structure symmetric to the structure of the negative side, and comprises a converter transformer 111b, a converter valve 112b, smoothing reactors 115b, a DC filter 117a, a bypass isolation knife switch 116b, a bypass AC switch 113b and isolation knife switches 114a, which will not be described in detail herein as they have the same functions as that components on the negative side.

The high-voltage end converter station 12 has a bipolar structure similar to the low-voltage end converter station 11. Particularly, the high-voltage end converter station 12 comprises: converter transformers 121a, 121b coupled to a second AC power supply 120; converter valves 122a, 122b coupled to the converter transformers 121a, 121b, smoothing reactors 125a and smoothing reactors 125b arranged on both sides of the converter valves 122a, 122b respectively; DC filters 127a, 127b across both ends of the smoothing reactors 125a and the smoothing reactors 125b respectively; bypass isolation knife switches 126a, 126b provided between the smoothing reactors 125a and the smoothing reactors 125b respectively; and bypass AC switches 123a, 123b and isolation knife switches 124a, 124b, which will not be described in detail herein as they have the same functions as that components of the low-voltage end converter station 11.

Incidentally, in the first embodiment shown in FIG. 1, there are DC filters connected across both sides of the smoothing reactors in the low-voltage end converter station 11 and the high-voltage end converter station 12 respectively, and harmonic current throughout the system can be eliminated with such a configuration. However, it should be noted that when selecting a wiring scheme for the cascaded multi-terminal HVDC power transmission system, a DC filter configuration can be selected reasonably depending on equivalent interference current requirements of a project. In the case that it is required to meet a standard about equivalent interference current all along the line, the configuration of providing a DC filter across both sides of the smoothing reactors is adopted; on the other hand, in the case of permitting substandard whole-line equivalent interference main current be not in standard, the DC filters can be canceled. Hereinafter, the configuration of the DC filters will be described in more detail below.

In the cascaded converter station according to the first embodiment, a grounding line 126 coupled to a grounding electrode and a metal return line 128 which is coupled between the positive line and the negative line are provided in the low-voltage end converter station 11. The grounding electrode may be provided at a distance of 40-50 km from the low-voltage end converter station 11. In addition, neutral bus switches (NBS) 119a, 119b, a neutral bus grounding switch (NBGS) 121, a grounding return transfer switch (GRTS) 120 and a metal return transfer switch (MRTS) 125 are provided in the wiring of the low-voltage end converter station 11. NBS 119a, 119b are used to rapidly isolate a pole which is locked to quit and a normal pole. NBGS 121 is used to switch the neutral bus to a temporal grounding grid of the low-voltage end converter station 11 when the grounding electrode quits in a bi-pole mode. MRTS 125 and GRTS 120 cooperate with each other to realize switching between monopole grounding return and monopole metal return.

The high-voltage end converter station 12 does not have a grounding line coupled to the grounding electrode and a metal return line set up therein.

FIG. 2 to FIG. 8 show seven operation wiring manners of the above cascaded converter station according to the first embodiment of this invention respectively:

(1) full bi-pole operation wiring;
(2) ¾ bi-pole operation wiring;
(3) ½ bi-pole operation wiring;
(4) full monopole grounding return wiring;
(5) ½ monopole grounding return wiring;
(6) full monopole metal return wiring;
(7) ½ monopole metal return wiring;

In these seven operation wiring modes, the full bi-pole operation wiring is the wiring manner in a normal operation condition, and the others are those in faulty conditions.

Figure 2:
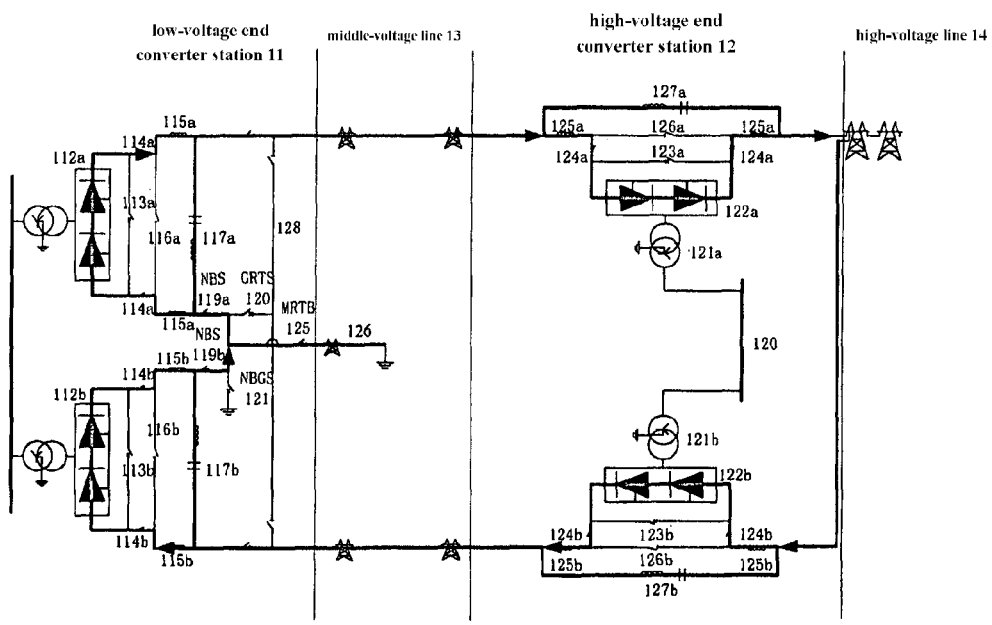
FIG. 2 shows the full bipolar wiring of the cascaded converter station in its normal operation state according to the first embodiment of this invention.

Referring to FIG. 2, in which the full bi-pole operation wiring in the normal operation condition is shown. The live portions of the cascaded converter station are illustrated by heavy lines. Four converter valves 112a, 112b, 122a, 122b in the positive and negative poles of the low-voltage end converter station 11 and the high-voltage end converter station 12 are all put into operation.

Figure 3A:
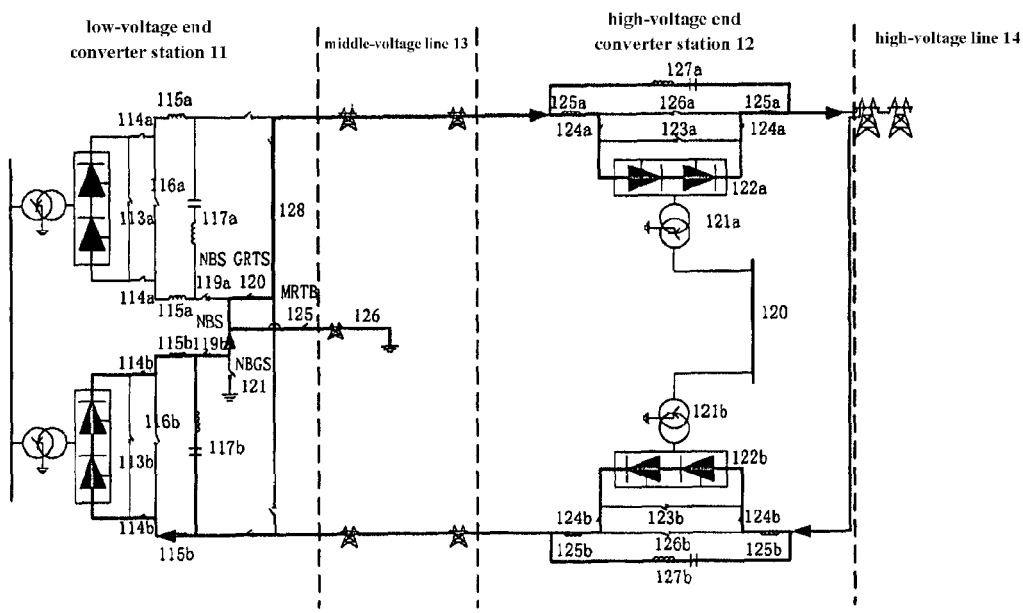
FIG. 3A-FIG. 3C show the ¾ bipolar wiring of the cascaded converter station of the first embodiment of this invention.
Figure 3B:
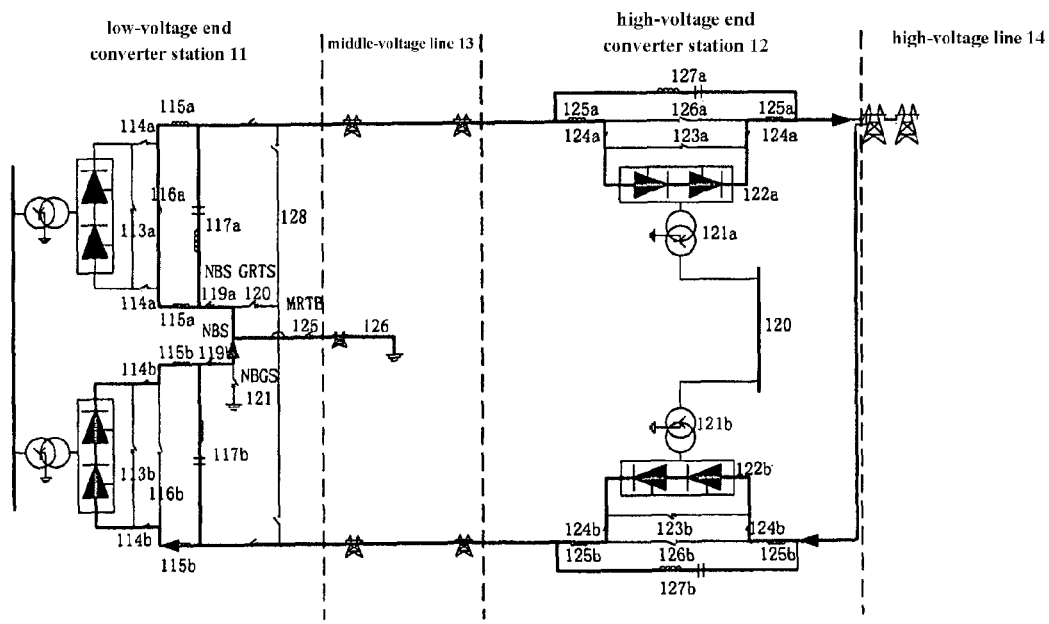
Figure 3C:
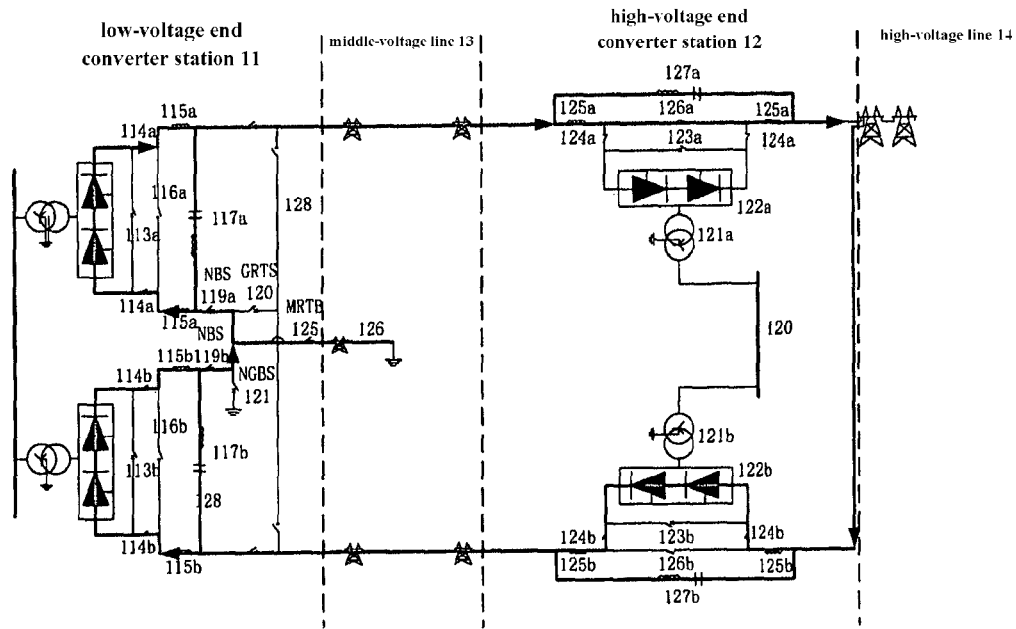

FIG. 3A to FIG. 3C show the ¾ bi-pole operation wiring. This operation manner means that, among the four converter valves 112a, 112b, 122a, 122b in the positive and negative poles of the low-voltage end converter station 11 and the high-voltage end converter station 12, a certain faulty converter valve quits operation, while other three converter valves keep running.

FIG. 3A and FIG. 3B show a schematic diagram of the operation wiring when the converter valve 112a of the low-voltage end quits operation. As shown in FIG. 3A and FIG. 3B, there are two bypass paths for the converter valve 112a out of service: a GRTS and metal return circuit, or a circuit with bypass isolation knife switches. When a failure occurs on the smoothing reactor 115a or the DC filter 117a of the low-voltage end converter valve 112a, it can be bypassed using the GRTS 120 and the metal return line 128. In this case, the converter valves 122a, 122b on the high-voltage end are still in operation. Because DC breakers are provided for both of these return circuits, switching can be performed on line.

FIG. 3C shows a schematic diagram of the operation wiring when the converter valve 122a on the high-voltage end quits operation. As shown in FIG. 3C, when the converter valve 122a on the high-voltage end quits operation, the smoothing reactors 125a on both sides of the converter valve are still connected in the operation circuit and do not quit.

Figure 4A:
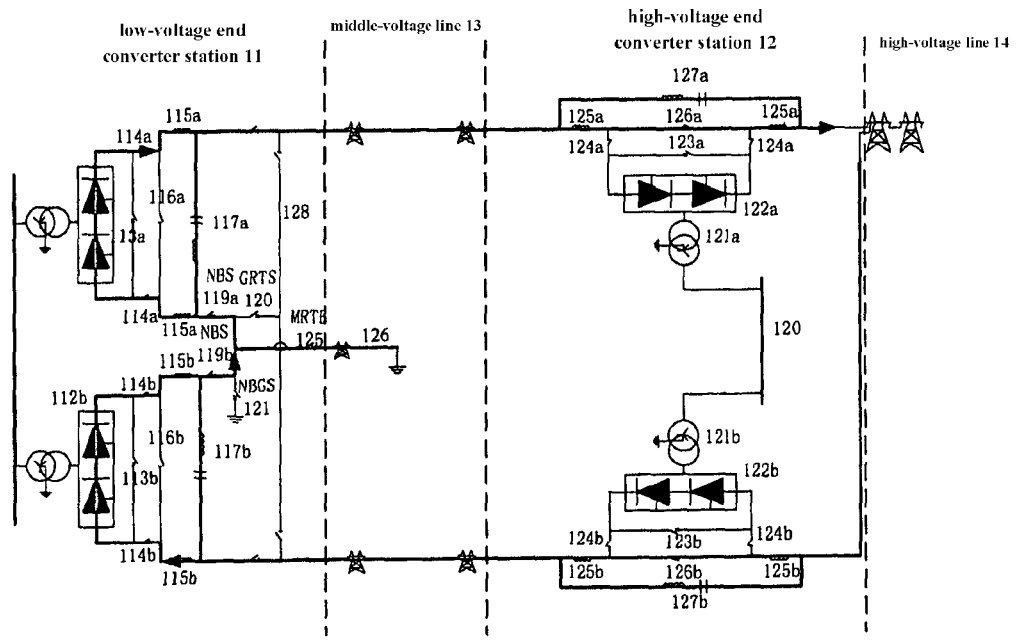
FIG. 4A-FIG. 4B show the ½ bipolar wiring of the cascaded converter station of the first embodiment of this invention.
Figure 4B:
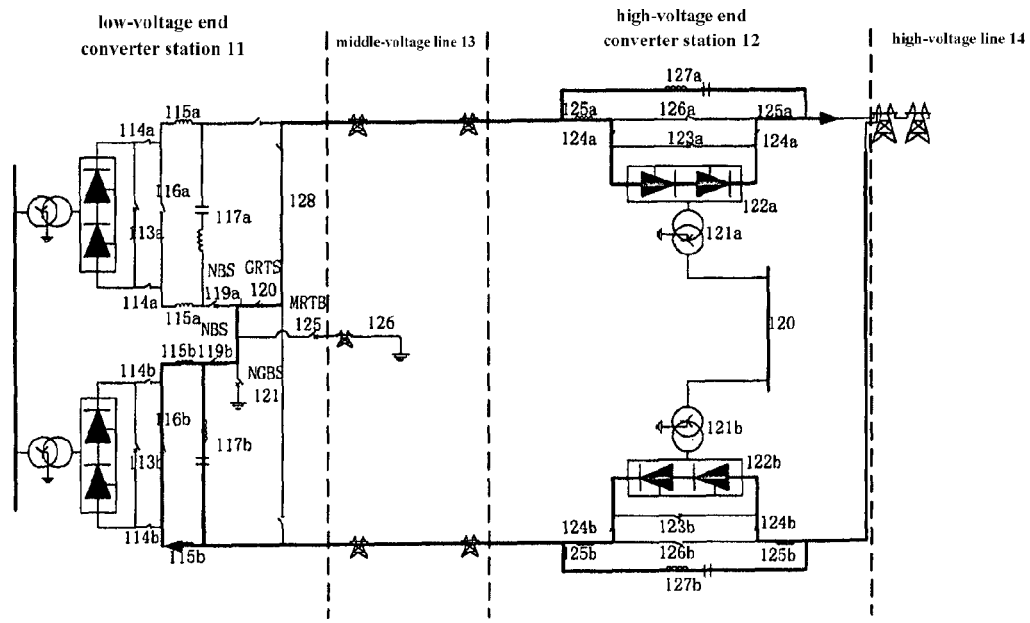

FIG. 4A and FIG. 4B show the ½ bi-pole operation wiring. This operation manner means that one converter station of the low-voltage end converter station 11 and the high-voltage end converter station 12 quits operation due to a failure, while the positive and negative poles of the other converter station still keep in operation.

FIG. 4A shows a schematic diagram of the operation wiring when the converter valves 122a and 122b at the high-voltage end quit operation. As shown in FIG. 4A, when the converter valves 122a and 122b at the high-voltage end quit operation, the smoothing reactors 125a and 125b on both sides of the converter valves are still connected in the operation circuit and do not quit.

FIG. 4B shows a schematic diagram of the operation wiring when the converter valves 112a and 112b at the low-voltage end quit operation. As shown in FIG. 4B, when the converter valve 112b at the low-voltage end quits operation, the smoothing reactors 115b on both sides of the converter valve are still connected in the operation circuit and do not quit.

Figure 5:
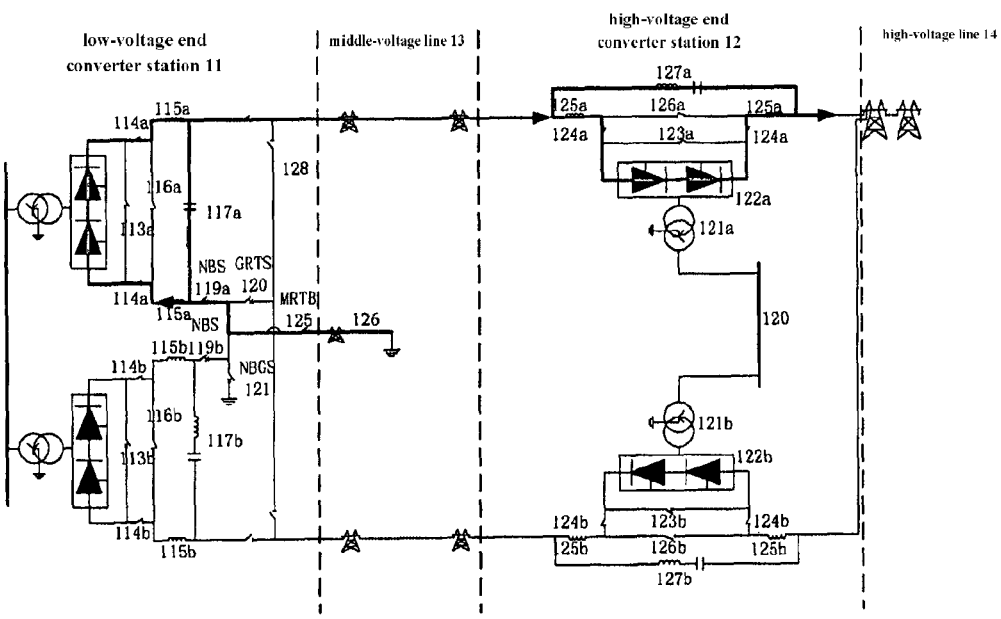
FIG. 5 shows the full monopole grounding return wiring of the cascaded converter station of the first embodiment of this invention.

FIG. 5 shows the full monopole grounding return wiring. This operation manner means that among the positive and negative poles of the low-voltage end converter station 11 and the high-voltage end converter station 12, converter valves of a pole quit operation due to a failure, while converter valves of the other pole (including the high-voltage end and the low-voltage end) still keep in operation, and a return circuit is formed through the grounding. FIG. 5 shows a condition in which the converter valve 112b at the low-voltage end and the converter valve 122b at the high-voltage end of the positive pole quit operation, while the converter valve 112a at the low-voltage end and the converter valve 122a at the high-voltage end of the negative pole keep in operation.

Figure 6A:
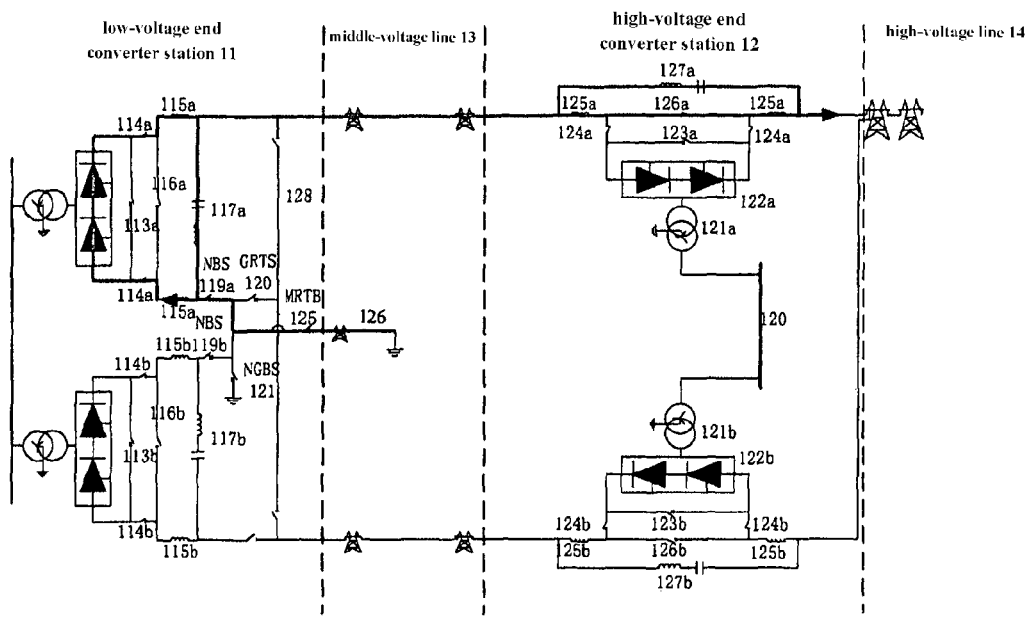
FIG. 6A-6B shows the ½ monopole grounding return wiring of the cascaded converter station of the first embodiment of this invention.
Figure 6B:
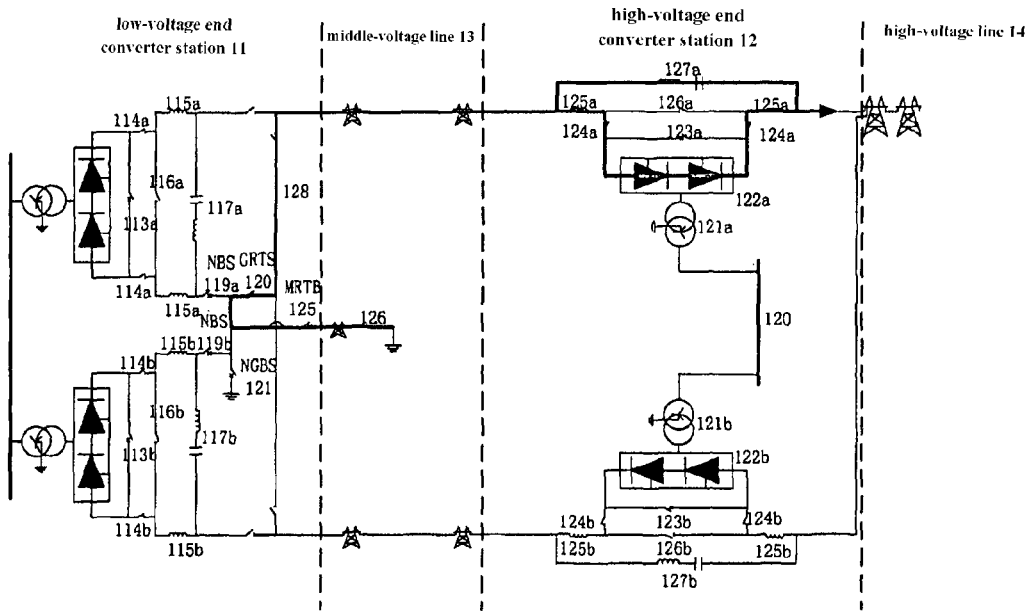

FIG. 6A and FIG. 6B show the ½ monopole grounding return wiring. This operation manner means that among the low-voltage end converter station 11 and the high-voltage end converter station 12, the converter valves of one converter station (including the positive and negative poles) quit operation due to a failure, while the converter valve of a pole in the other converter station keeps in operation, and a return circuit is formed through the earth.

FIG. 6A shows a schematic diagram of the operation wiring when the converter valves 122a and 122b of the high-voltage end converter station 12 quit operation, while only the converter valve 112a of the negative pole in the low-voltage end converter station 11 keeps in operation. As shown in FIG. 6A, when converter valves 122a of the high-voltage end quits operation, the smoothing reactors 125a on both sides of the converter valve are still connected in the operation circuit and do not quit.

FIG. 6B shows a schematic diagram of the operation wiring when the converter valves 112a and 112b of the low-voltage end converter station 11 quit operation, while only the converter valve 122a of the negative pole in the high-voltage end converter station 12 keeps in operation.

Figure 7:
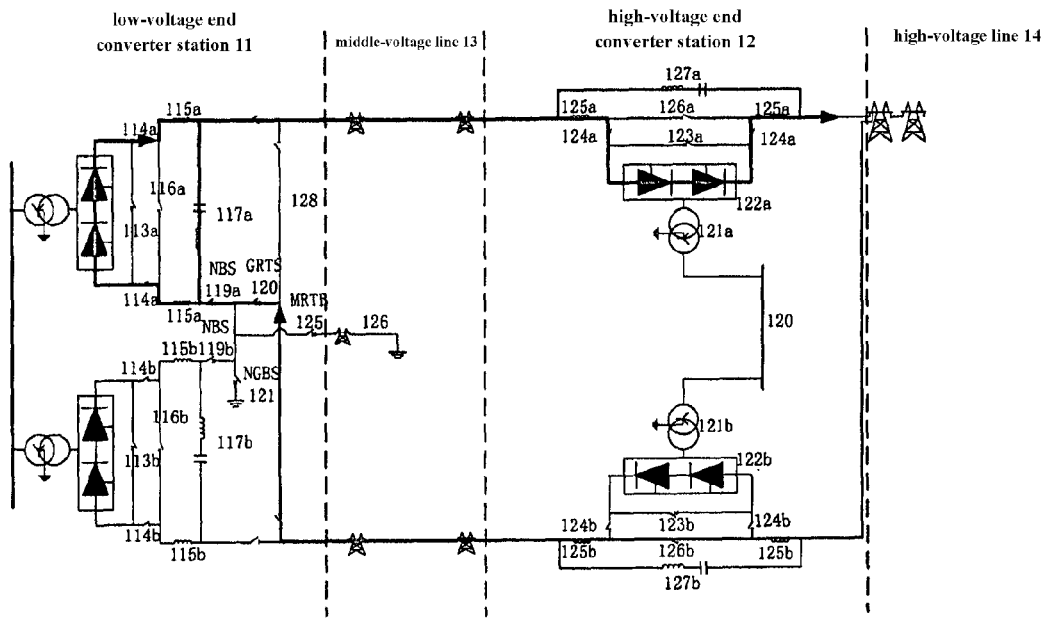
FIG. 7 shows the full monopole metal return wiring of the cascaded converter station of the first embodiment of this invention.

FIG. 7 shows the full monopole metal return wiring. This operation manner means that among the positive and negative poles of the low-voltage end converter station 11 and the high-voltage end converter station 12, converter valves of a pole quit operation due to a failure, while converter valves of the other pole (including the high-voltage end and the low-voltage end) still keep in operation, and a return circuit is formed through a metal line. FIG. 7 shows a condition in which the converter valve 112b at the low-voltage end and the converter valve 122b at the high-voltage end of the positive pole quit operation, while the converter valve 112a at the low-voltage end and the converter valve 122a at the high-voltage end of the negative pole keep in operation.

Figure 8A:
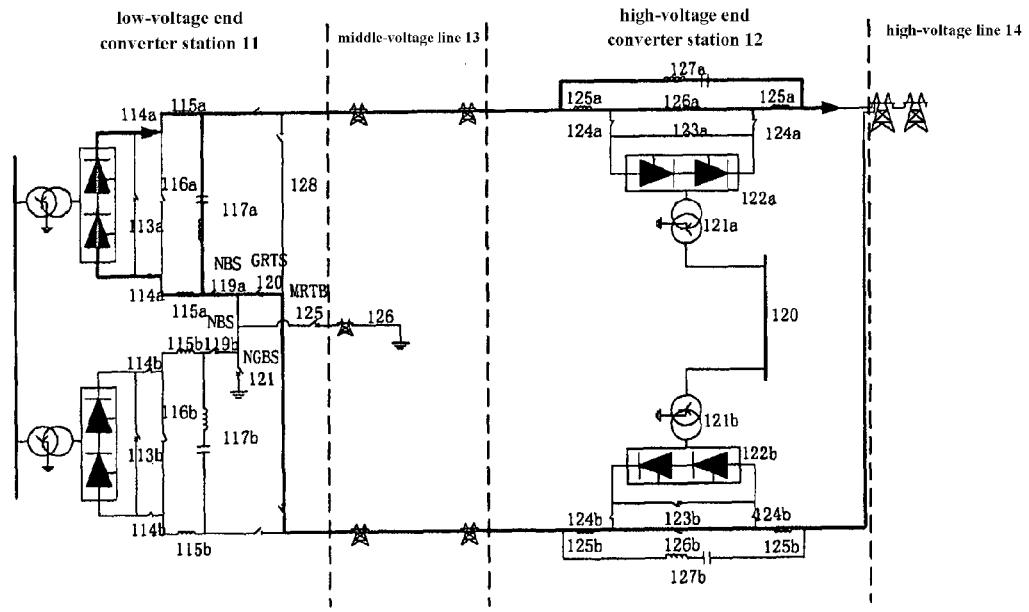
FIG. 8A and FIG. 8B show the ½ monopole metal return wiring of the cascaded converter station of the first embodiment of this invention.
Figure 8B:
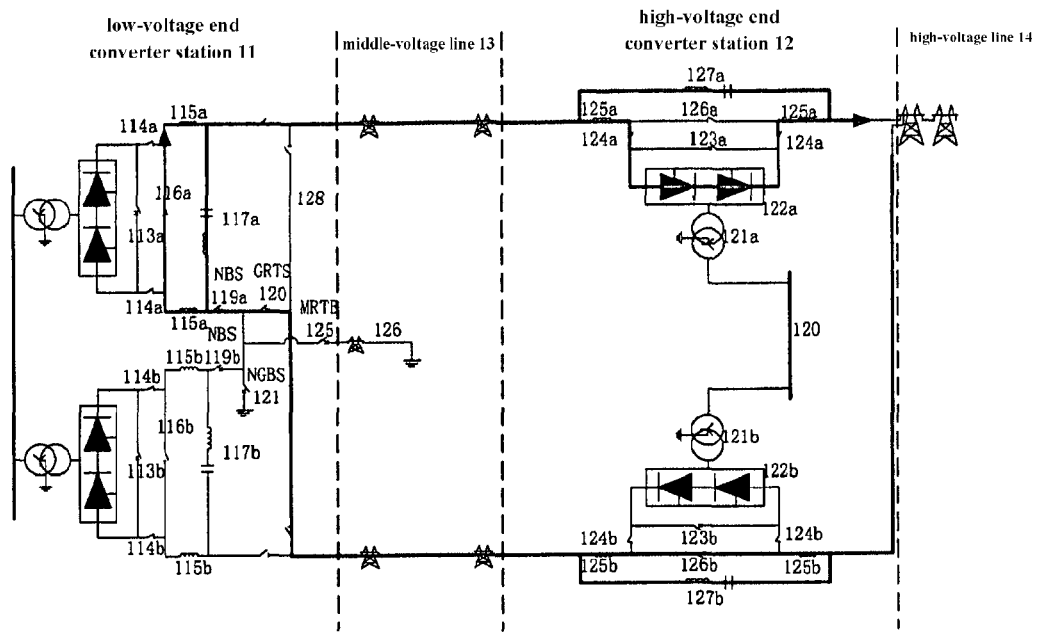

FIG. 8A and FIG. 8B show the ½ monopole metal return wiring. This operation manner means that among the low-voltage end converter station 11 and the high-voltage end converter station 12, the converter valves of one converter station (including the positive and negative poles) quit operation due to a failure, while only the converter valve of one pole in the other converter station keeps in operation, and a return circuit is formed through a metal line.

FIG. 8A shows a schematic diagram of the operation wiring when the converter valves 122a and 122b of the high-voltage end converter station 12 quit operation, while only the converter valve 112a of the negative pole in the low-voltage end converter station 11 keeps in operation. As shown in FIG. 8A, when the high-voltage end converter station 122a and 122b quit operation, the smoothing reactors 125a and 125b on both sides of the converter valves are still connected in the operation circuit and do not quit.

FIG. 8B shows a schematic diagram of the operation wiring when the converter valves 112a and 112b of the low-voltage end converter station 11 quit operation, while only the converter valve 122a of the negative pole in the high-voltage end converter station 12 keeps in operation. As shown in FIG. 8B, when the high-voltage end converter valve 122b and the low-voltage end converter valve 112a quit operation, the smoothing reactors 125b and 115a on both sides of the converter valves are still connected in the operation circuit and do not quit.

The advantages of the wiring schemes of the cascaded converter station according to the first embodiment of this invention as depicted with reference to FIG. 1 to FIG. 8 are: when a converter valve in the low-voltage end converter station 11 stop working, online bypass is achieved using a metal return line or a bypass isolation knife switch, to provide control flexibility. The circuit has a less number of elements, and thus higher reliability. In addition, as compared with the Xiang jiaba-Shang hai HVDC power transmission system in the prior art, because the metal return line 128 is provided in the low-voltage end converter station 11, the same function is realized with a lower isolation level that is required for the devices.

In the wiring schemes of the cascaded converter station according to the first embodiment of this invention, if a failure occurs on the middle-voltage DC line of a single pole, or on neutral bus devices of a single pole in the low-voltage converter station (NBS, the isolation knife switch, CT, PT and other devices), only monopole grounding return operation is possible. If a failure occurs on the middle-voltage lines of the two poles, the two poles have to stop operation. In order to improve energy availability, according to a second embodiment of this invention, another cascaded converter station is provided.

Figure 9:
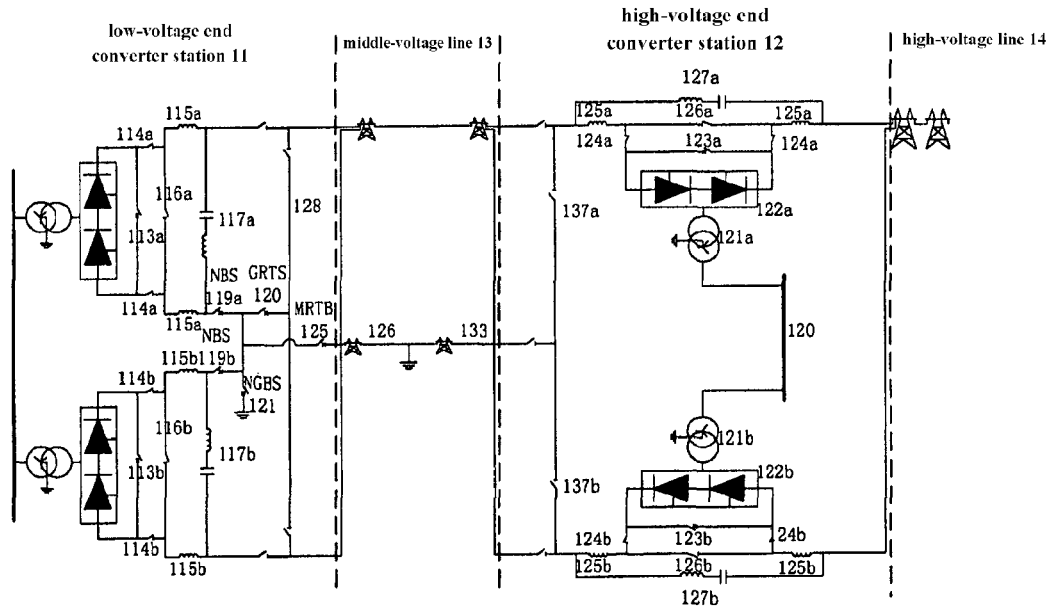
FIG. 9 is a schematic diagram of the structure and wiring of a cascaded converter station used in cascaded multi-terminal HVDC power transmission according to a second embodiment of this invention.

FIG. 9 is a schematic diagram of the structure and wiring of a cascaded converter station used in cascaded multi-terminal HVDC power transmission according to a second embodiment of this invention.

As compared with the first embodiment, in the cascaded converter station according to the second embodiment, a grounding line 133 coupled to a grounding electrode is set up in the high-voltage end converter station 12. In addition, neutral bus isolation knife switches 137a, 137b are added.

Similar to the first embodiment, FIG. 10 to FIG. 16 show seven operation wiring manners of the cascaded converter station according to the third embodiment of this invention respectively:

(1) full bi-pole operation wiring;
(2) ¾ bi-pole operation wiring;
(3) ½ bi-pole operation wiring;
(4) full monopole grounding return wiring;
(5) ½ monopole grounding return wiring;
(6) full monopole metal return wiring;
(7) ½ monopole metal return wiring.

Figure 10:
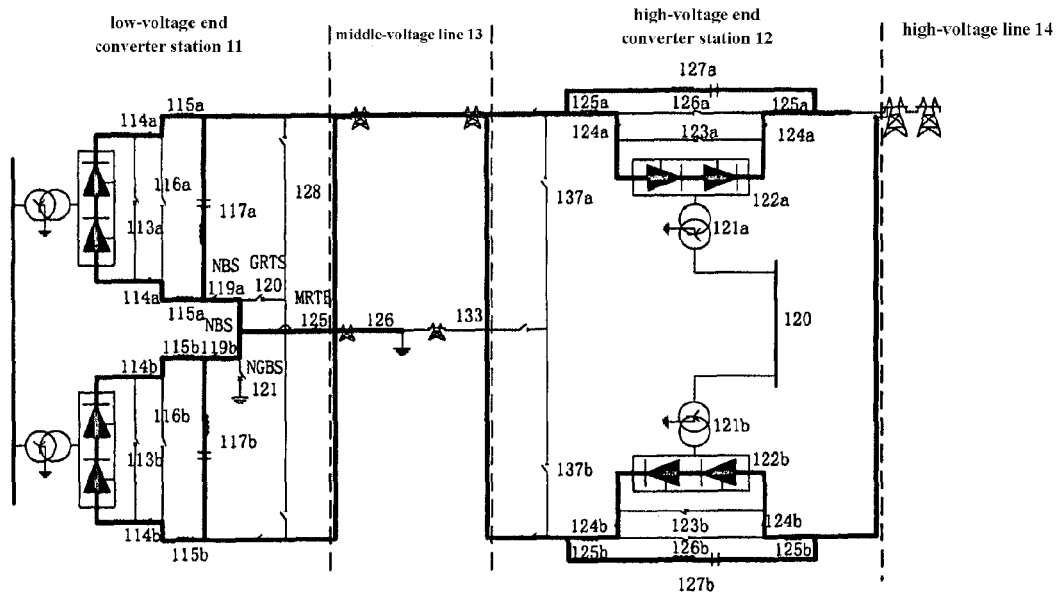
FIG. 10 shows the full bipolar wiring of the cascaded converter station in its normal operation state according to the second embodiment of this invention.

Referring to FIG. 10, in which the full bi-pole operation wiring in a normal operation condition is shown. Four converter valves 112a, 112b, 122a, 122b in the positive and negative poles of the low-voltage end converter station 11 and the high-voltage end converter station 12 are all put into operation.

Figure 11A:
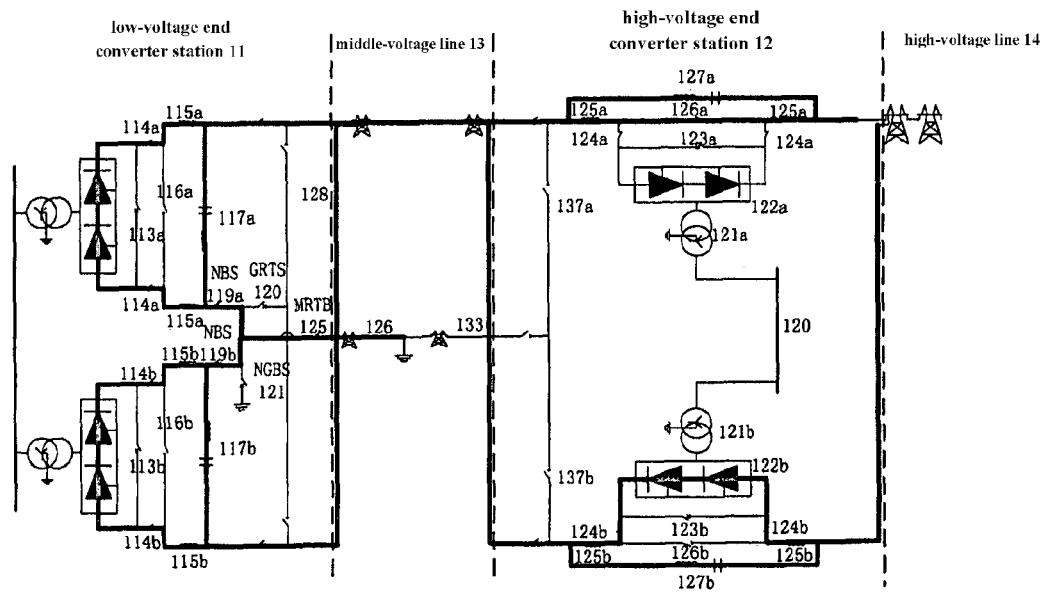
FIG. 11A-FIG. 11C show the ¾ bipolar wiring of the cascaded converter station of the second embodiment of this invention.
Figure 11B:
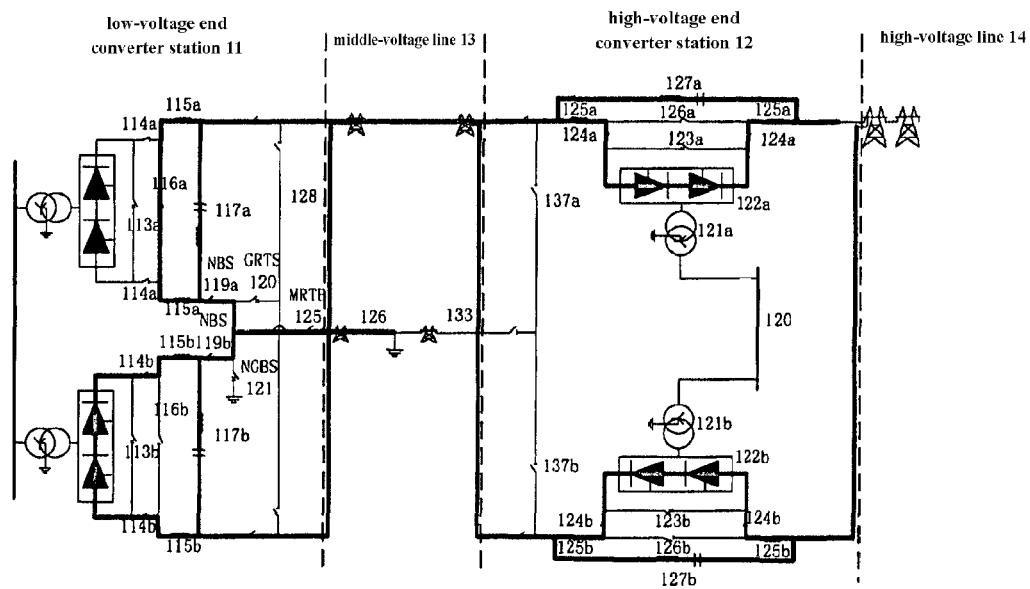
Figure 11C:
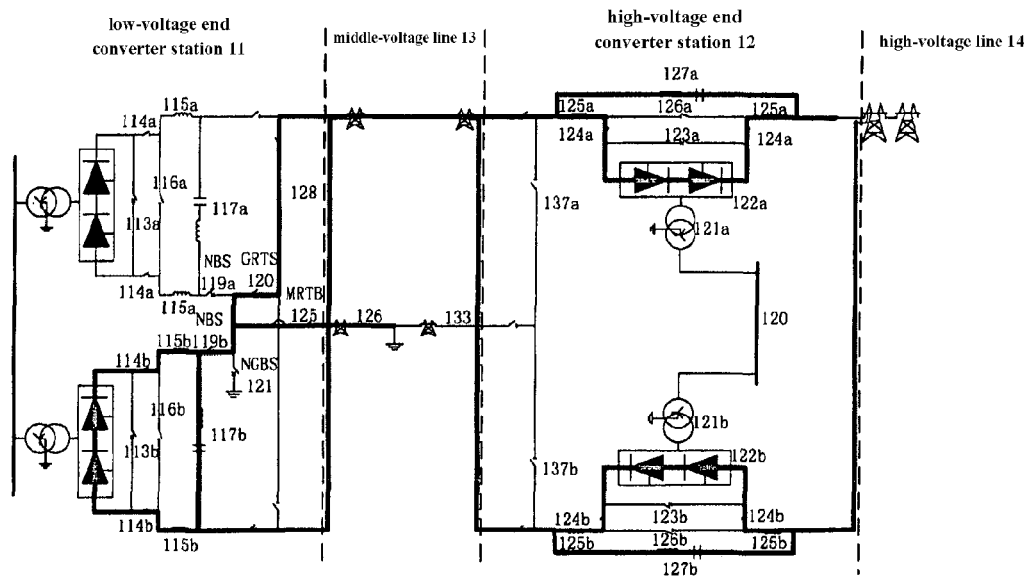

FIG. 11A to FIG. 11C show the ¾ bi-pole operation wiring.

FIG. 11A shows a schematic diagram of the operation wiring when the high-voltage end converter valve 122a quits operation. As shown in FIG. 11A, when the high-voltage end converter valve 122a quits operation, the smoothing reactors 125a on both sides of the converter valve are still connected in the operation circuit and do not quit.

FIG. 11B and FIG. 11C show a schematic diagram of the operation wiring when the low-voltage end converter valve 112a quits operation. As shown in FIG. 11B and FIG. 11C, there are two bypass paths for the converter valve 112a out of service: a GRTS and metal return circuit, or a circuit with bypass isolation knife switches. When a failure occurs on the smoothing reactor 115a or the DC filter 117a of the low-voltage end converter valve 112a, it can be bypassed using the GRTS 120 and the metal return circuit 128.

Figure 12A:
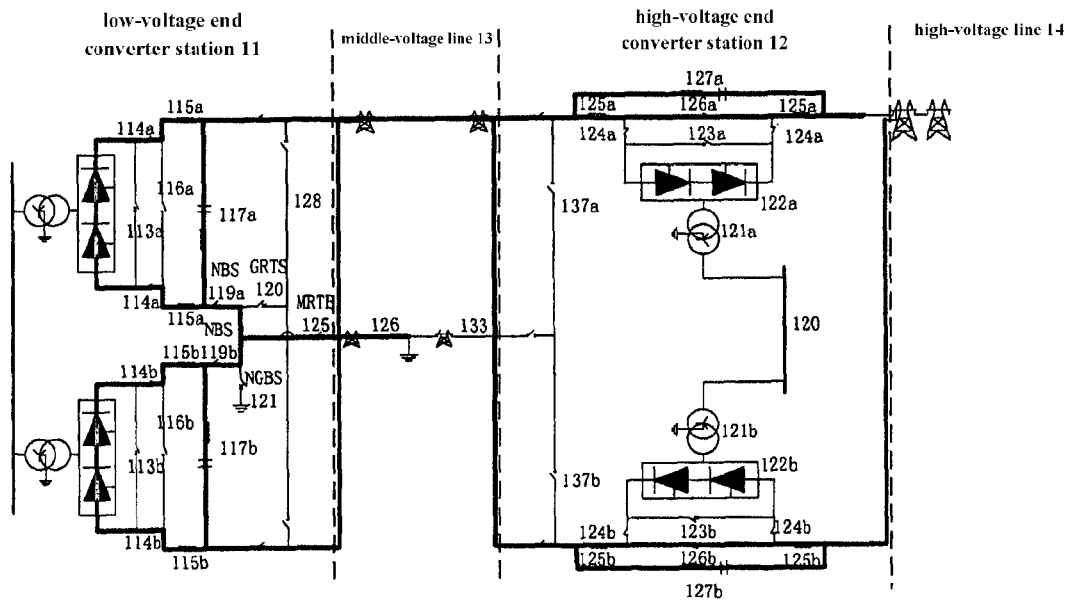
FIG. 12A-FIG. 12B show the ½ bipolar wiring of the cascaded converter station of the second embodiment of this invention.
Figure 12B:
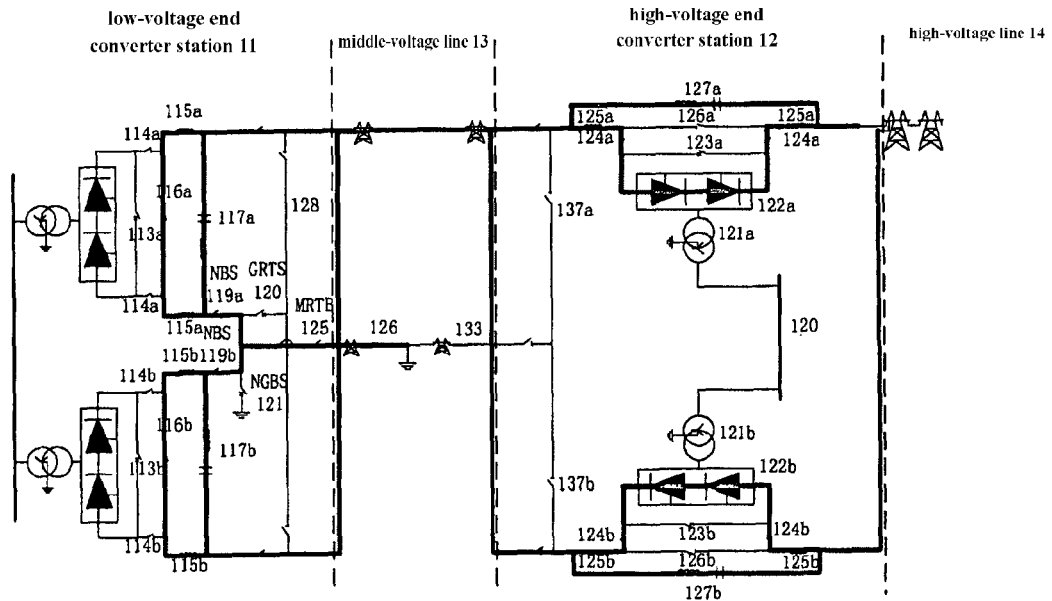

FIG. 12A and FIG. 12B show the ½ bi-pole operation wiring.

FIG. 12A shows a schematic diagram of the operation wiring when the high-voltage end converter valves 122a and 122b quit operation. As shown in FIG. 12A, when the high-voltage end converter valves 122a and 122b quit operation, the smoothing reactors 125a and 125b on both sides of the converter valves are still connected in the operation circuit and do not quit.

FIG. 12B shows a schematic diagram of the operation wiring when the low-voltage end converter valves 112a and 112b quit operation. As shown in FIG. 12B, when the low-voltage end converter valves 112a and 112b quit operation, the smoothing reactors 115a and 115b on both sides of the converter valves are still connected in the operation circuit and do not quit.

Figure 13:
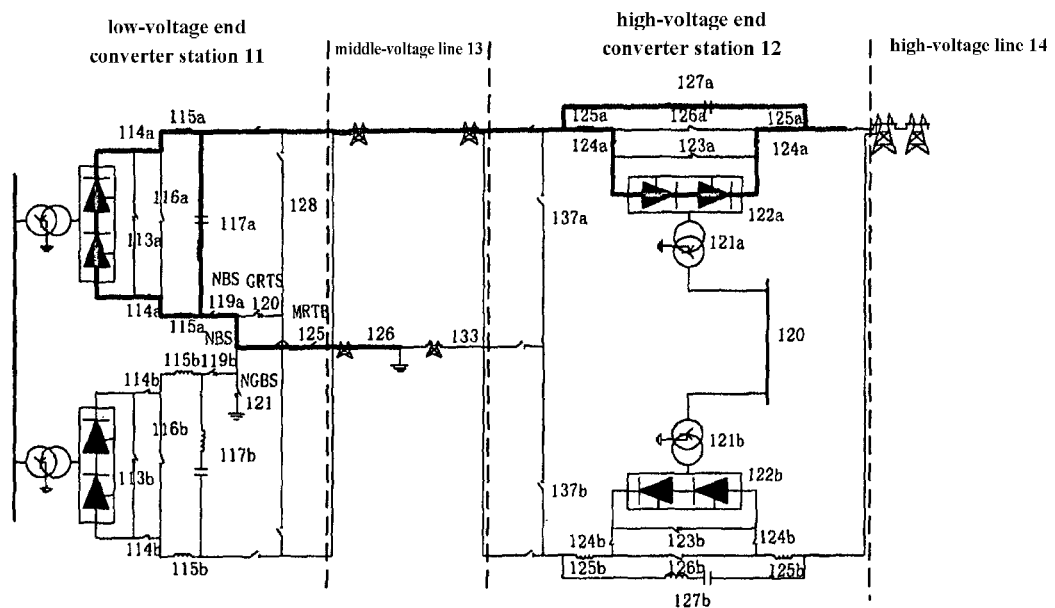
FIG. 13 shows the full monopole grounding return wiring of the cascaded converter station of the second embodiment of this invention.

FIG. 13 shows the full monopole grounding return wiring, in which the low-voltage end converter valve 112b and the high-voltage end converter valve 122b of the positive pole quit operation, while the low-voltage end converter valve 112a and the high-voltage end converter valve 122a of the negative pole keep in operation.

Figure 14A:
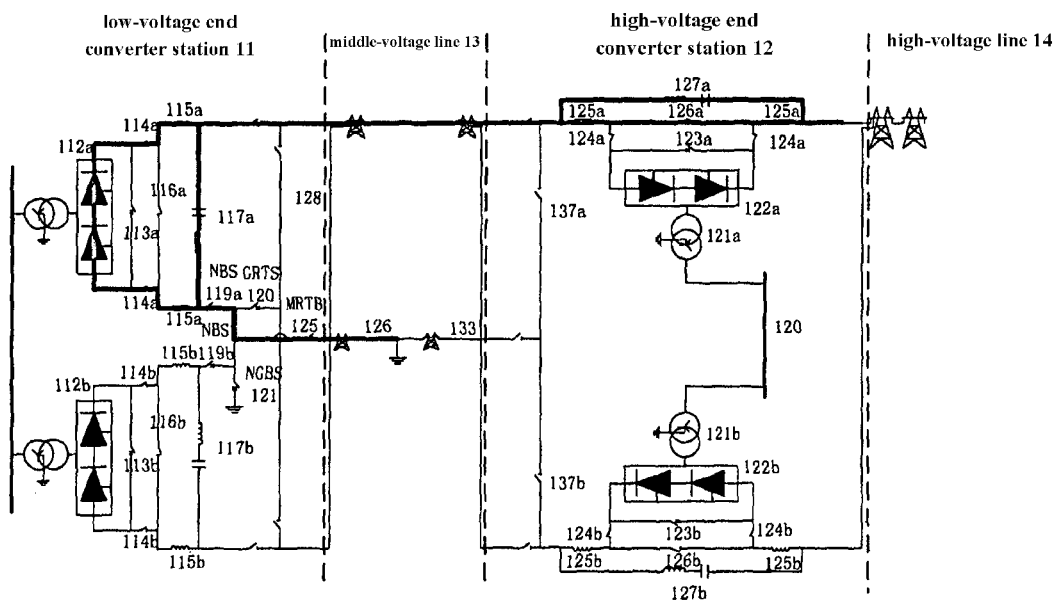
FIG. 14A-14C show the ½ monopole grounding return wiring of the cascaded converter station of the second embodiment of this invention.
Figure 14B:
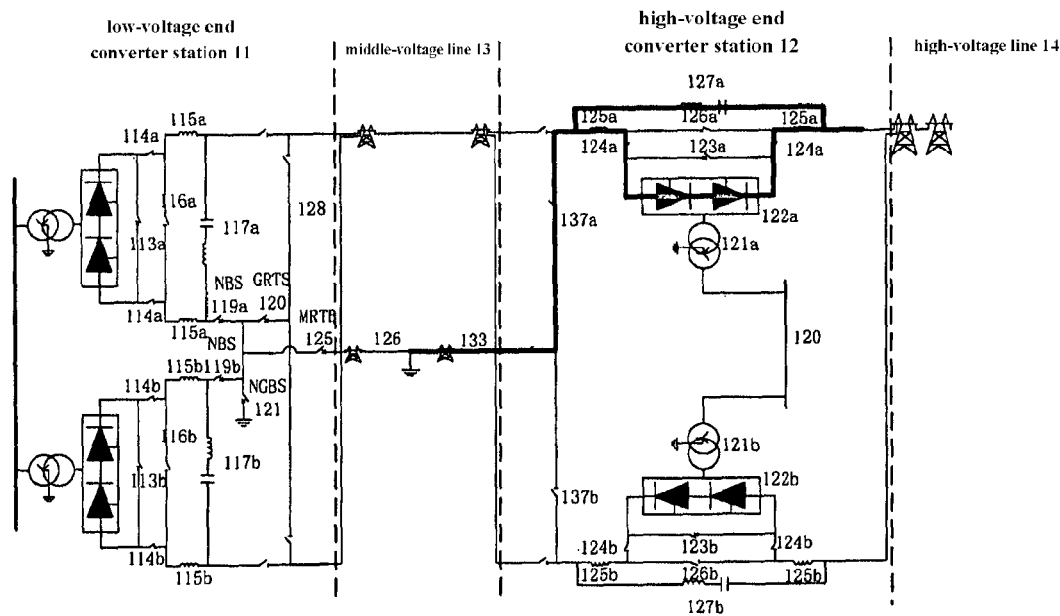
Figure 14C:
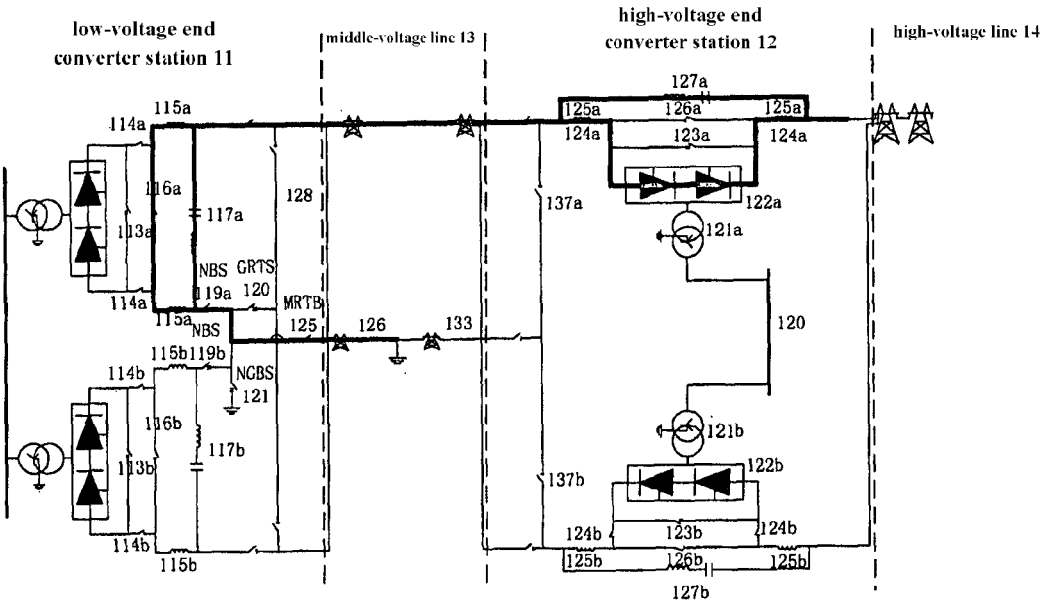

FIG. 14A to FIG. 14C show the ½ monopole grounding return wiring.

FIG. ANA shows a schematic diagram of the operation wiring when the converter valves 122a and 122b of the high-voltage end converter station 12 quit operation, while only the converter valve 112a of the negative pole in the low-voltage end converter station 11 keeps in operation. As shown in FIG. 14A, when the high-voltage end converter station 122a quits operation, the smoothing reactors 125a on both sides of the converter valve are still connected in the operation circuit and do not quit.

FIG. 14B and FIG. 14C show a schematic diagram of the operation wiring when the converter valves 112a and 112b of the low-voltage end converter station 11 quit operation, while only the converter valve 122a of the negative pole in the high-voltage end converter station 12 keeps in operation.

Figure 15:
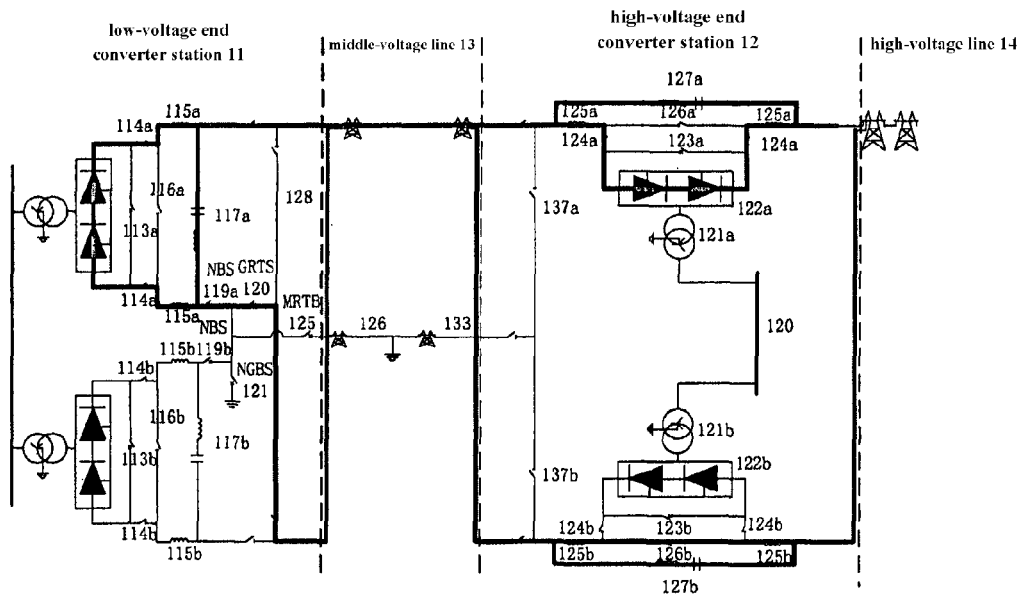
FIG. 15 shows the full monopole metal return wiring of the cascaded converter station of the second embodiment of this invention.

FIG. 15 shows the full monopole metal return wiring, in which the low-voltage end converter valve 112b and the high-voltage end converter valve 122b of the positive pole quit operation, while the low-voltage end converter valve 112a and the high-voltage end converter valve 122a of the negative pole keep in operation.

Figure 16A:
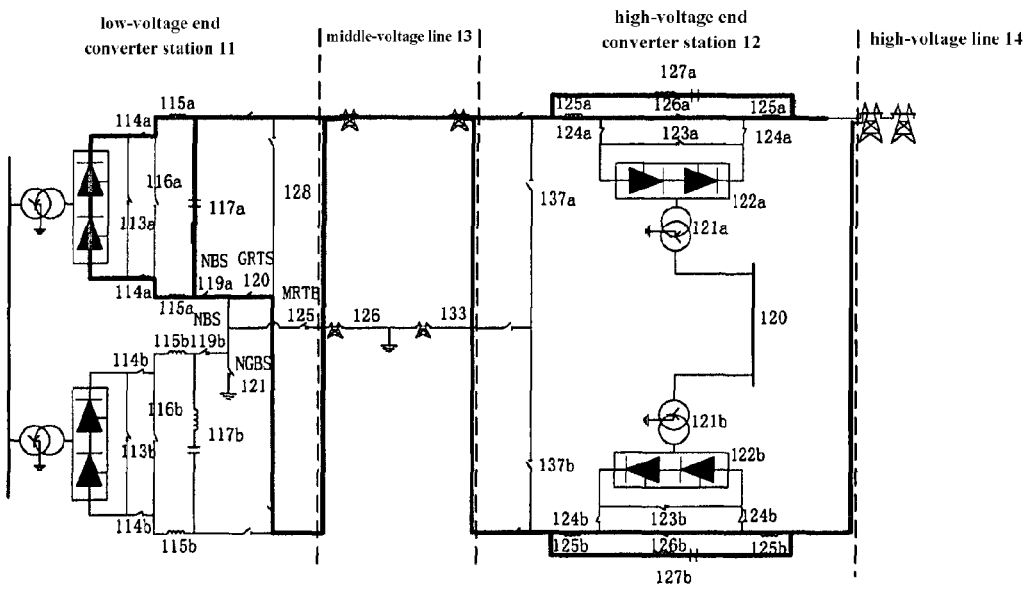
FIG. 16A-FIG. 16C show the ½ monopole metal return wiring of the cascaded converter station of the second embodiment of this invention.
Figure 16B:
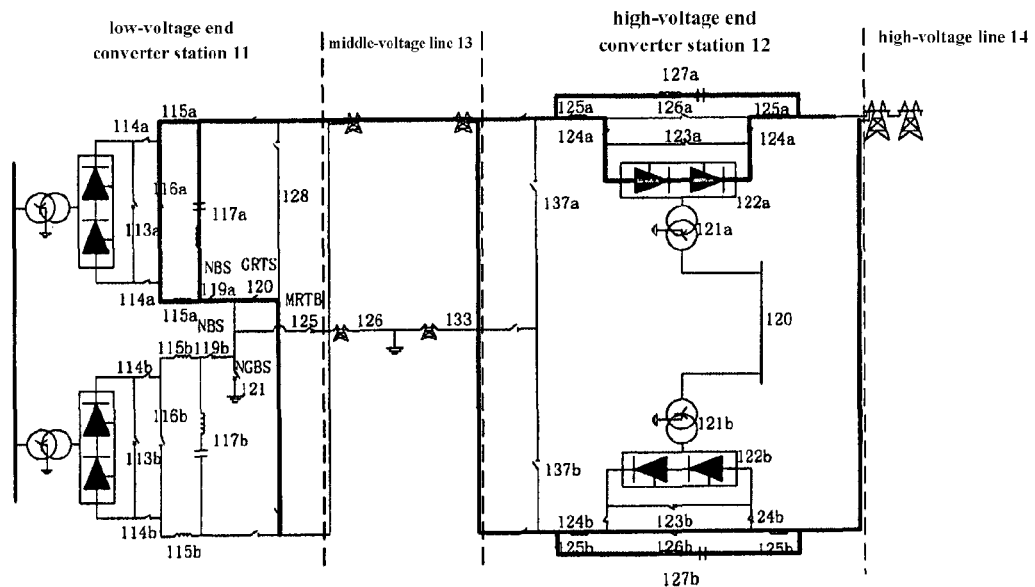
Figure 16C:
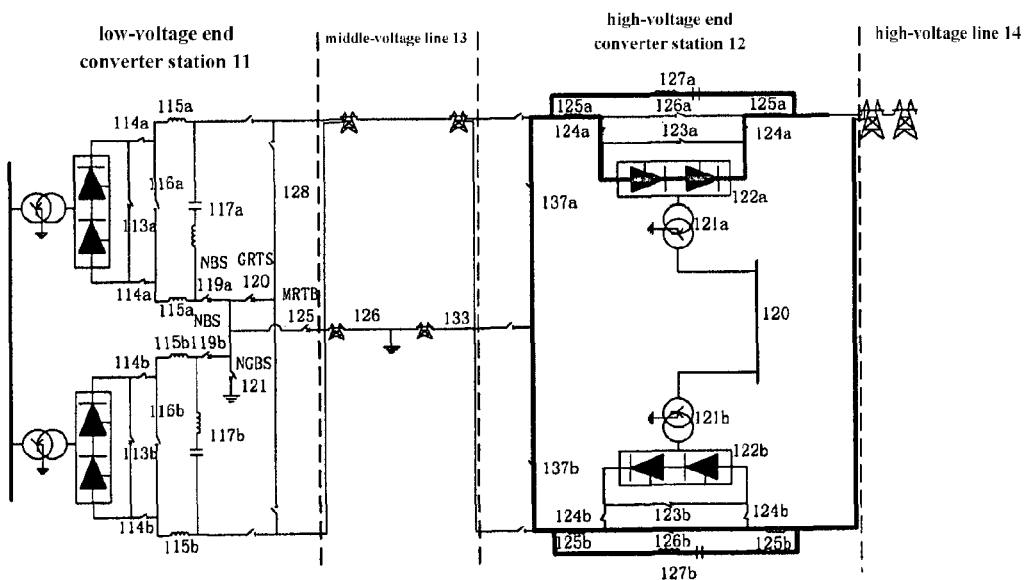

FIG. 16A to FIG. 16C show the ½ monopole metal return wiring.

FIG. 16A shows a schematic diagram of the operation wiring when the converter valves 122a and 122b of the high-voltage end converter station 12 quit operation, while only the converter valve 112a of the negative pole in the low-voltage end converter station 11 keeps in operation. As shown in FIG. 16A, when the high-voltage end converter station 122a and 122b quit operation, the smoothing reactors 125a and 125b on both sides of the converter valves are still connected in the operation circuit and do not quit.

FIG. 16B, FIG. 16C show a schematic diagram of the operation wiring when the converter valves 112a and 112b of the low-voltage end converter station 11 quit operation, while only the converter valve 122a of the negative pole in the high-voltage end converter station 12 keeps in operation. As shown in FIG. 16B and FIG. 16C, when the high-voltage end converter valve 122b quits operation, the smoothing reactors 125b on both sides of the converter valve are still connected in the operation circuit and do not quit.

The energy availability of the cascaded converter station according to the second embodiment is higher than that of the first embodiment. When a failure occurs on the middle-voltage lines of the two poles or low-voltage end converter station on neutral bus devices (NBS, NBGS, isolation knife switch, and other devices) of the two poles, the low-voltage end converter station 11 quits operation, and the high-voltage end converter station 12 operates by means of a metal return line of a single pole or a grounding return line of a single pole.

Based on the wiring schemes of the cascaded converter station of the second embodiment, other wiring schemes can be obtained through expansion according to particular project requirements.

Figure 17:
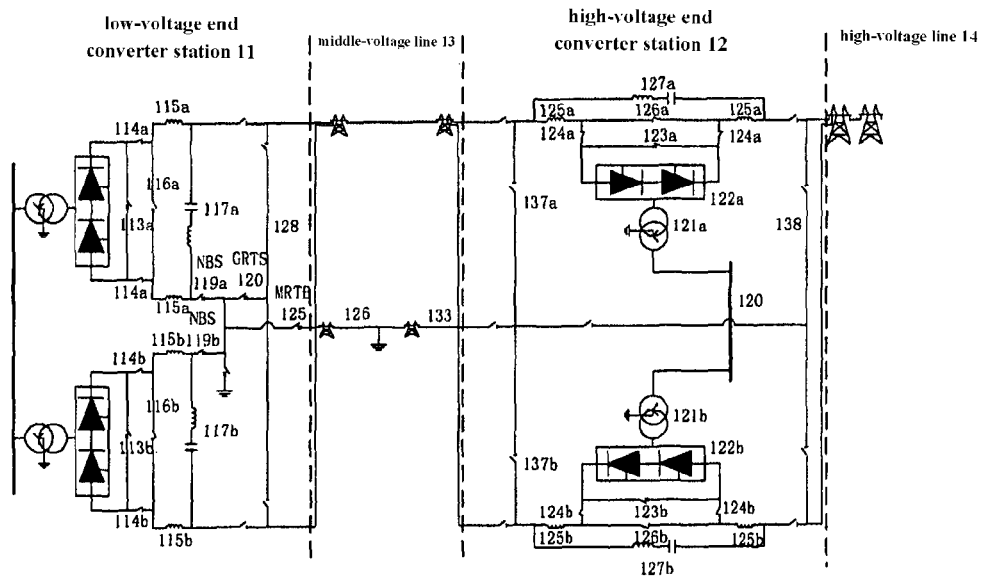
FIG. 17 shows a first expanded wiring scheme of the cascaded converter station of the second embodiment of this invention.
Figure 18:
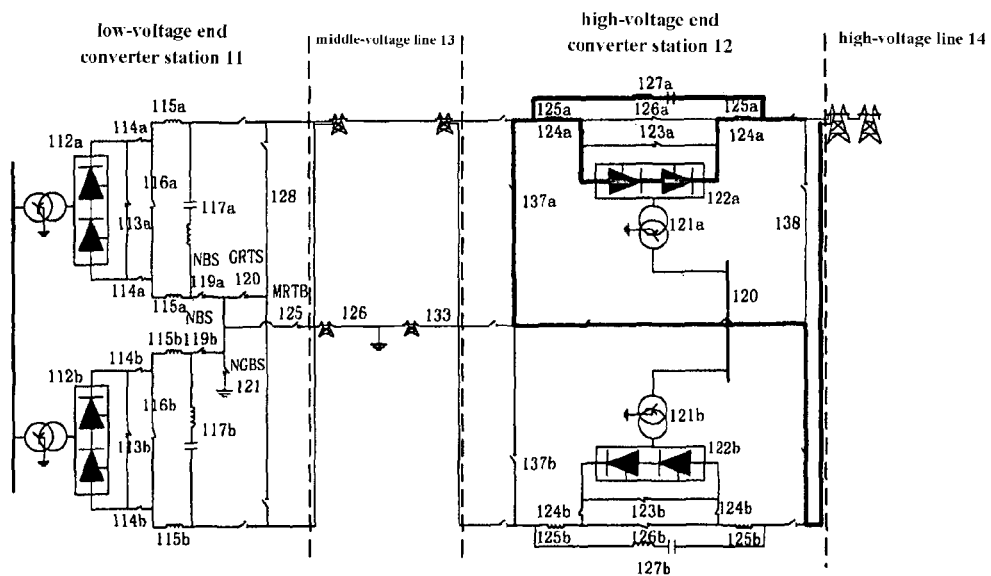
FIG. 18 shows the monopole metal return wiring of the high-voltage end converter station in the first expanded wiring scheme of the second embodiment of this invention.

FIG. 17 shows a first expanded wiring scheme based on the second embodiment, in which a metal return line 138 is added in the high-voltage end converter station 12. When the high-voltage end converter station 12 is in monopole metal return operation, the smoothing reactors 125b and the DC filter 127b of the other pole in the station can be bypassed, as shown in FIG. 18.

Figure 19:
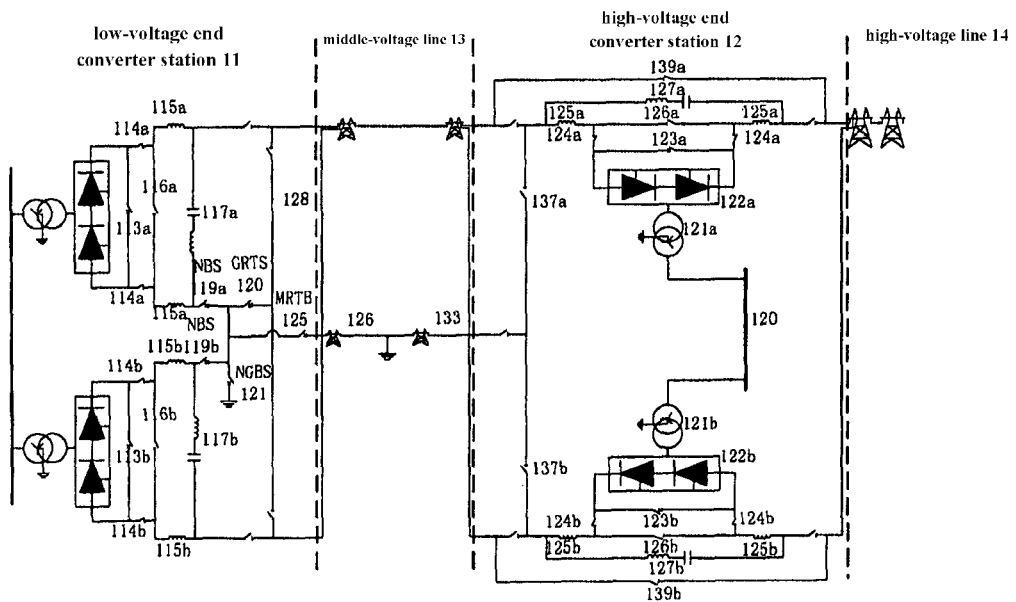
FIG. 19 shows a second expanded wiring scheme of the cascaded converter station of the second embodiment of this invention.
Figure 20:
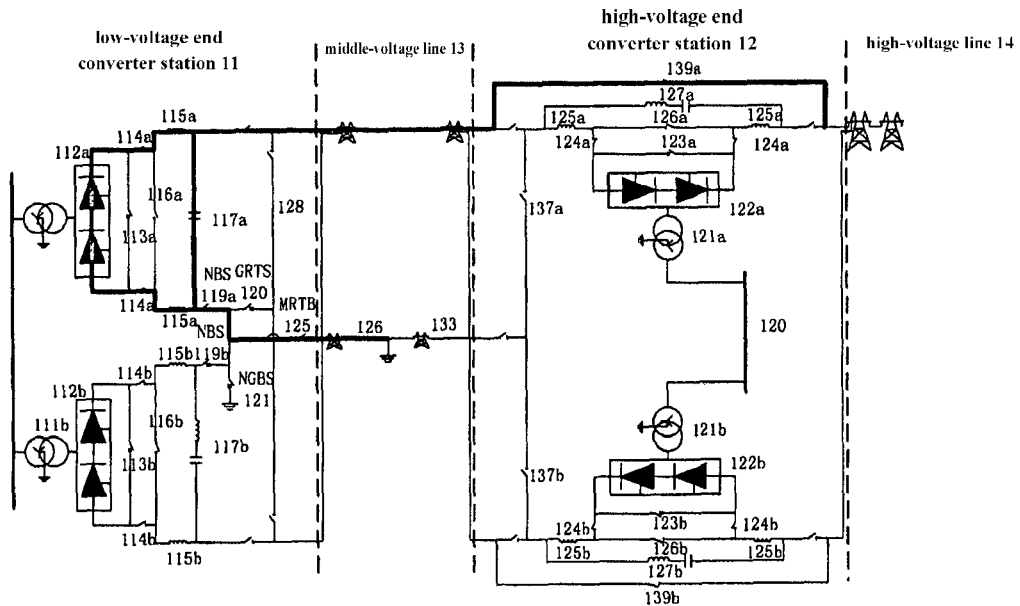
FIG. 20 shows the monopole metal return wiring of the low-voltage end converter station in the second expanded wiring scheme of the second embodiment of this invention.

FIG. 19 shows a second expanded wiring scheme based on the second embodiment, in which converter station bypass paths 139a and 139b are added in the high-voltage end converter station 12. The low-voltage end converter station 11 may operate even if a failure occurs on the smoothing reactors or the DC filter of the high-voltage end converter station 12, as shown in FIG. 20, in which the monopole grounding return wiring of the low-voltage end converter station 11 is shown.

In the first embodiment, in the double pole or monopole grounding return state, if a failure occurs on the smoothing reactors, the DC filter, or the bypass isolation knife switch of a single pole of the low-voltage end converter station 11, it can be bypassed using the metal return line and the GRTS; however, if a single pole failure occurs on the middle voltage 400 kV DC power transmission line or on neutral bus devices of single pole such as NBS, CT, PT and the isolation knife switch of a single pole (N−1 failure), that pole has to be stopped, and double pole DC operation cannot be realized. In order to further improve energy availability, according to a third embodiment of this invention, another cascaded converter station is provided.

Figure 21:
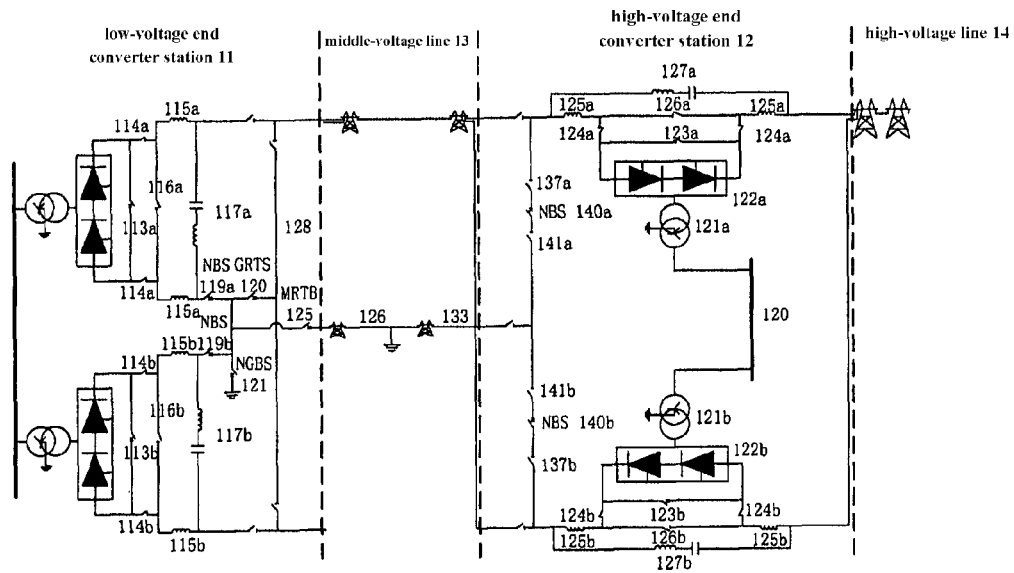
FIG. 21 is a schematic diagram of the structure and wiring of a cascaded converter station used in cascaded multi-terminal HVDC power transmission according to a third embodiment of this invention.

FIG. 21 is a schematic diagram of the structure and wiring of a cascaded converter station used in cascaded multi-terminal HVDC power transmission according to a third embodiment of this invention.

As compared with the second embodiment, on the basis of adding a neutral bus isolation knife switch, two NBS breakers 140a, 140b and two neutral bus isolation knife switches 141a, 141b are further added.

Figure 22:
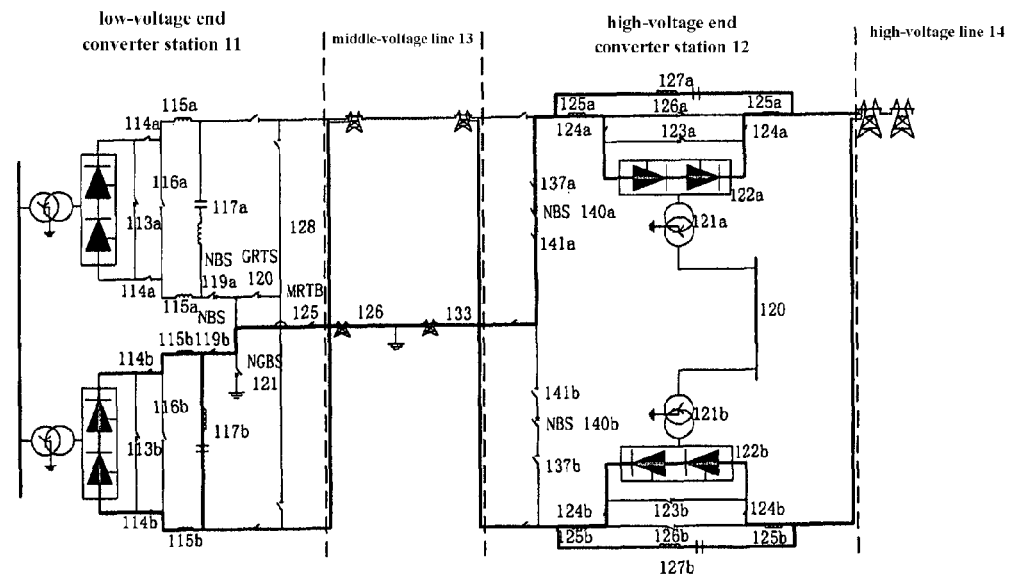
FIG. 22 shows the ¾ bipolar wiring of the cascaded converter station of the third embodiment of this invention.

With the wiring of the third embodiment, when a N−1 failure occurs, that is, a single pole failure of the 400 kV middle voltage DC power transmission line or a failure on neutral bus devices such as NBS, CT, PT and the isolation knife switch of a single pole, the cascaded converter station can operate in a ¾ double pole state, as shown in FIG. 22.

When a N−2 failure occurs, that is, when a failure occurs on the middle-voltage lines of the two poles or the low-voltage end converter station 11 is in power-off service, the high-voltage end converter station 12 may operate in the double pole, the monopole metal return, or monopole grounding return state, to improve energy availability of the system. Because NBS 140a, 140b are provided in the neutral bus line of the high-voltage end converter station 12, when the low-voltage end converter station 11 is in maintenance and the high-voltage end converter station 12 operates in the double pole state, it is not necessary to stop double pole operation if a single pole failure occurs, as shown in FIG. 23, in which the double pole operation wiring of the high-voltage end converter station 12 is shown.

Figures 23, 24:
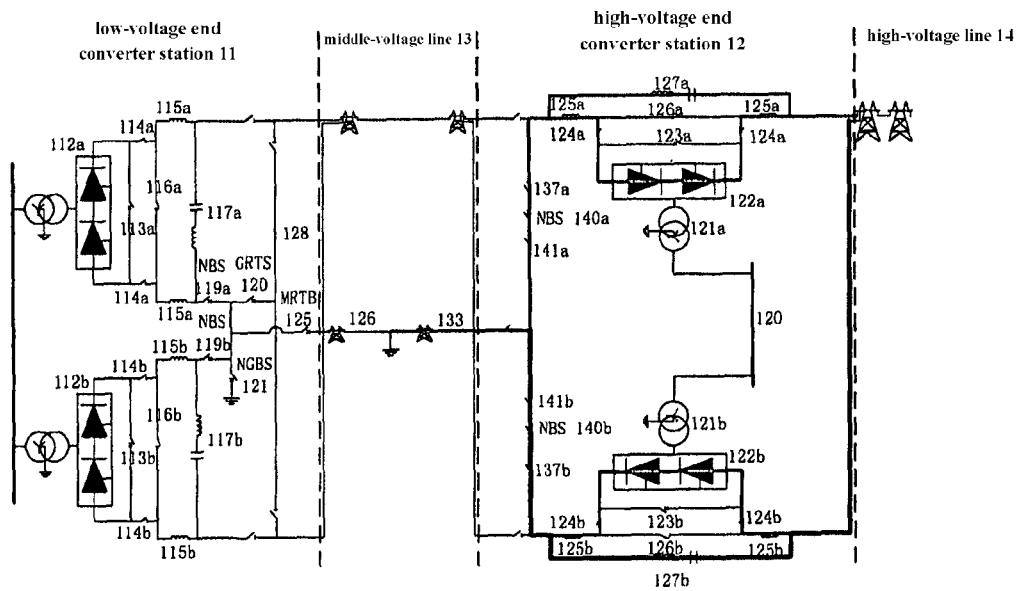
FIG. 23 shows the bipolar wiring of the high-voltage end converter station in the cascaded converter station of the third embodiment of this invention.
FIG. 24 shows an expanded wiring scheme of the cascaded converter station of the third embodiment of this invention.

Based on the wiring scheme of the third embodiment, if it is required for the high-voltage end converter station 12 to switch online between single pole grounding return and single pole metal line return, to operate without passing through the separate metal return line of the other converter station and operate in the bi-pole state using a converter station temporal grounding, the expanded wiring scheme shown in FIG. 24 can be adopted, in which a metal return line 138 and MRTB 143, GRTS 142, NGBS 144 are added in the high-voltage end converter station 12.

Figure 25:
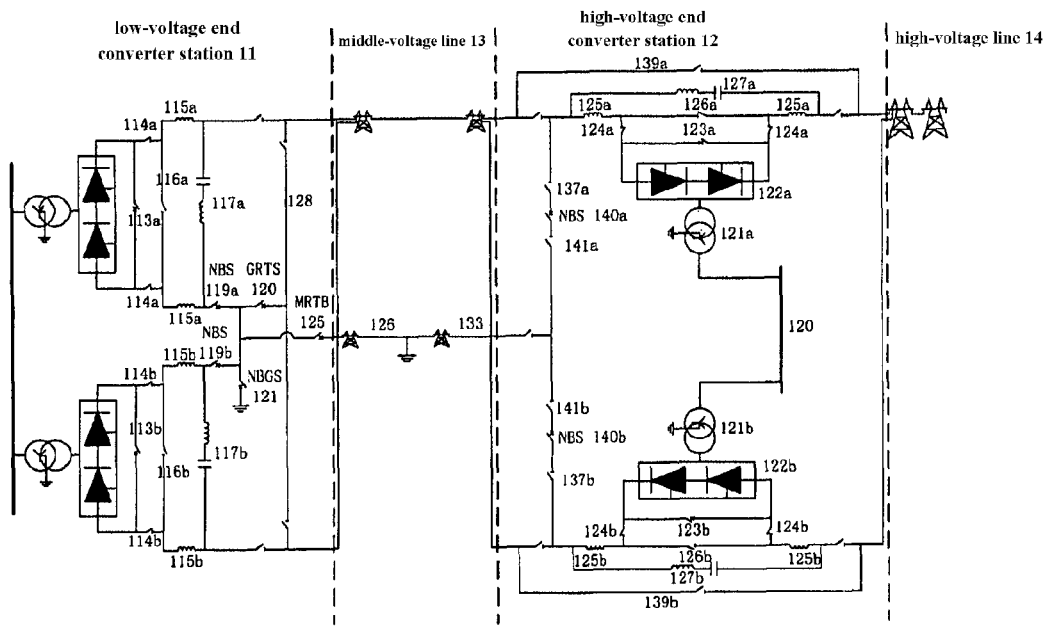
FIG. 25 is a schematic diagram of the structure and wiring of a cascaded converter station used in cascaded multi-terminal HVDC power transmission according to a fourth embodiment of this invention.

FIG. 25 is a schematic diagram of the structure and wiring of a cascaded converter station used in cascaded multi-terminal HVDC power transmission according to a fourth embodiment of this invention.

As compared with the third embodiment, in the cascaded converter station of the fourth embodiment, bypass paths 139a, 139b for bypassing the high-voltage end converter station 12 are coupled between the middle-voltage DC power transmission line 13 and the high-voltage DC power transmission line 14. 800 KV isolation knife switches are provided between the smoothing reactors 125a, 125b and the high-voltage DC power transmission line 14, and in the bypass paths 139a, 139b.

FIG. 26 to FIG. 32 show seven operation wiring modes of the above cascaded converter station according to the fourth embodiment of this invention respectively:

(1) full bi-pole operation wiring;
(2) ¾ bi-pole operation wiring;
(3) ½ bi-pole operation wiring;
(4) full monopole grounding return wiring;
(5) ½ monopole grounding return wiring;
(6) full monopole metal return wiring;
(7) ½ monopole metal return wiring.

In these seven operation wiring modes, the full bi-pole operation wiring is a wiring mode in the normal operation condition, and other operation wiring modes are those in faulty conditions.

Figure 26:
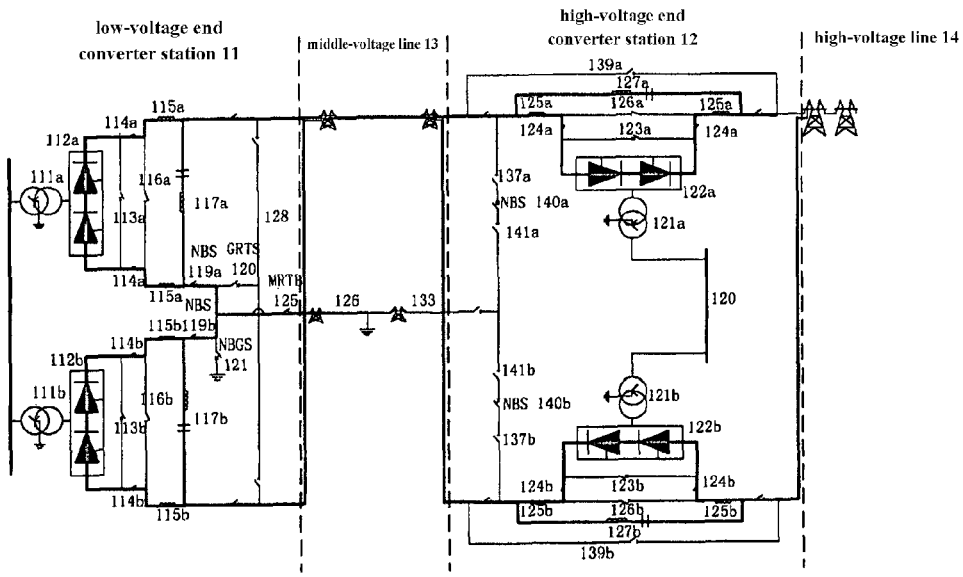
FIG. 26 shows the full bipolar wiring of the cascaded converter station in its normal operation state according to the fourth embodiment of this invention.

Referring to FIG. 26, in which the full bi-pole operation wiring in the normal operation condition is shown. Four converter valves 112a, 112b, 122a, 122b in the positive and negative poles of the low-voltage end converter station 11 and the high-voltage end converter station 12 are all put into operation.

Figure 27A:
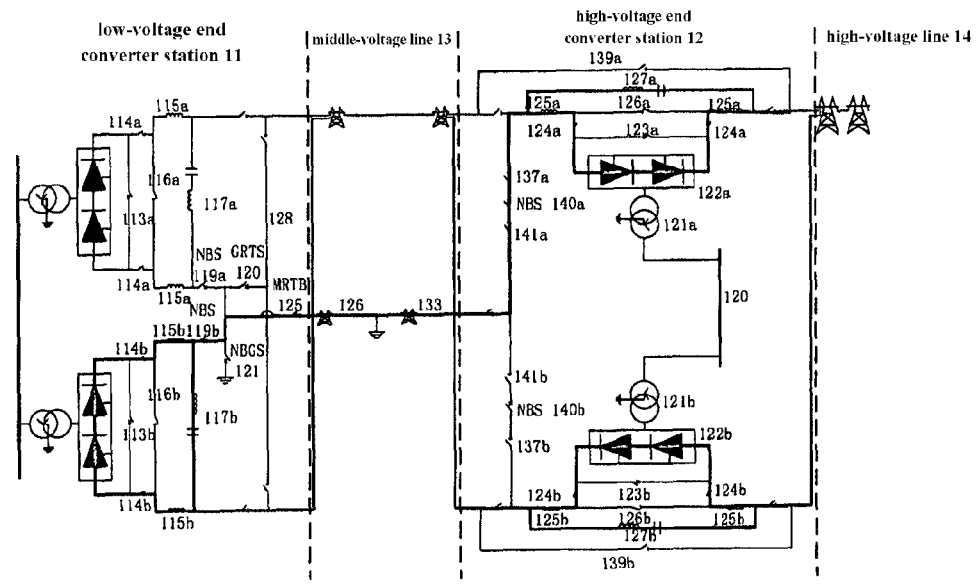
FIG. 27A-FIG. 27B show the ¾ bipolar wiring of the cascaded converter station of the fourth embodiment of this invention.
Figure 27B:
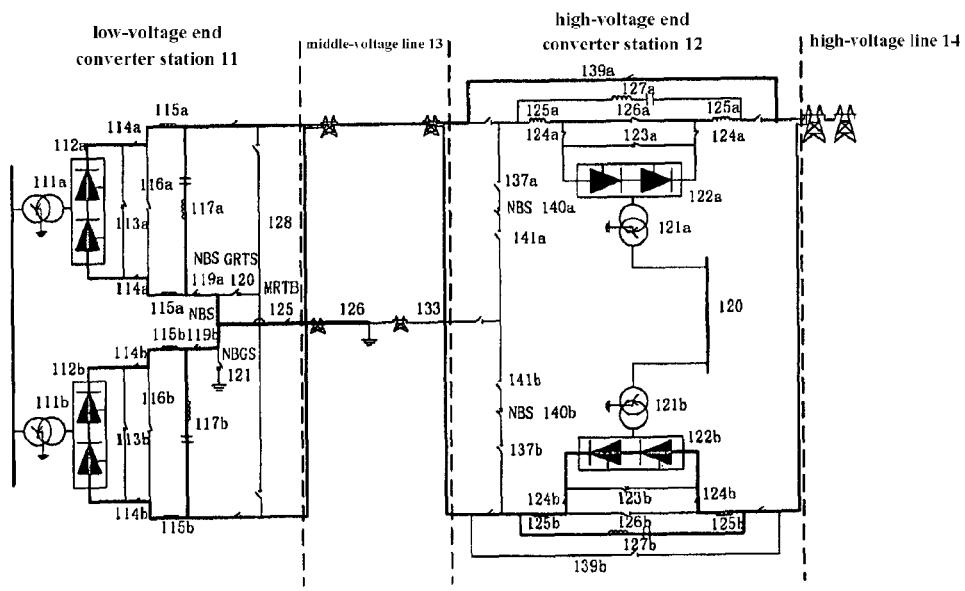

FIG. 27A, FIG. 27B show the ¾ bi-pole operation wiring. FIG. 27A shows a schematic diagram of the operation wiring when the low-voltage end converter valve 122a quits operation. FIG. 27B shows a schematic diagram of the operation wiring when the high-voltage end converter valve 122a quits operation. As shown in FIG. 27B, when the high-voltage end converter valve 122a quits operation, a return loop is formed through the bypass path 139a, and the smoothing reactors 125a, etc. are not connected in the operation circuit.

Figure 28A:
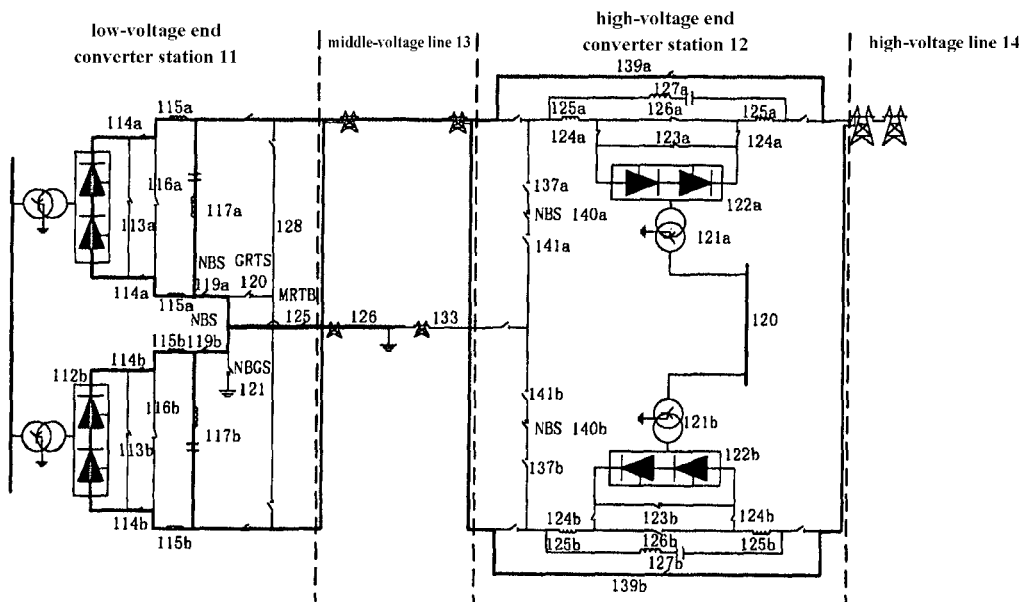
FIG. 28A-FIG. 28B show the ½ bipolar wiring of the cascaded converter station of the fourth embodiment of this invention.
Figure 28B:
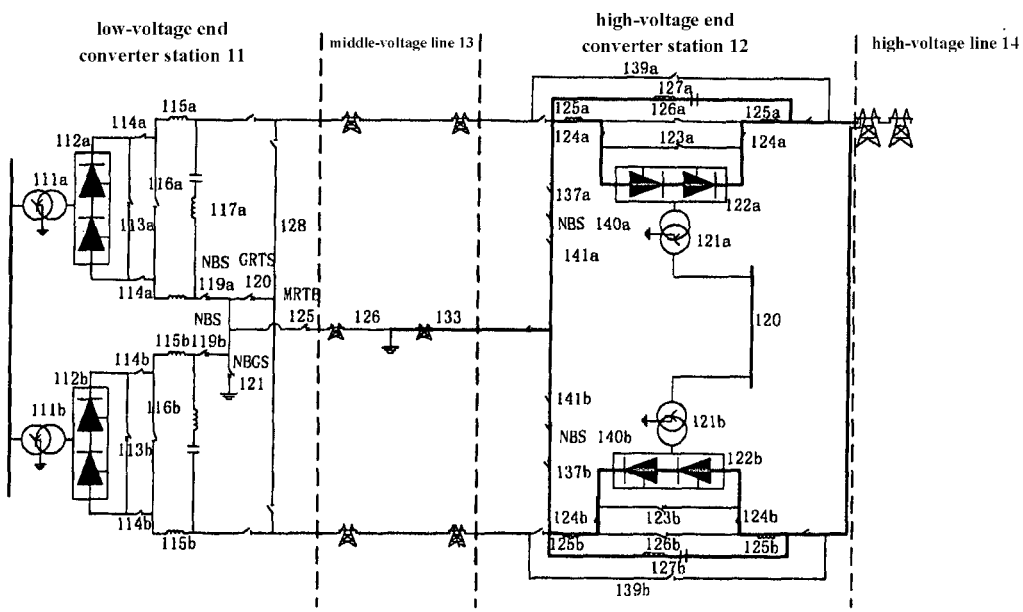

FIG. 28A and FIG. 28B show the ½ bi-pole operation wiring. FIG. 28A shows a schematic diagram of the operation wiring when the high-voltage end converter valves 122a and 122b quit operation. As shown in FIG. 28A, when the high-voltage end converter valves 122a and 122b quit operation, a return loop is formed through the bypass paths 139a, 139b, and the smoothing reactors 125a, 125b etc. are not connected in the operation circuit. FIG. 28B shows a schematic diagram of the operation wiring when the low-voltage end converter valves 122a and 122b quit operation.

Figure 29:
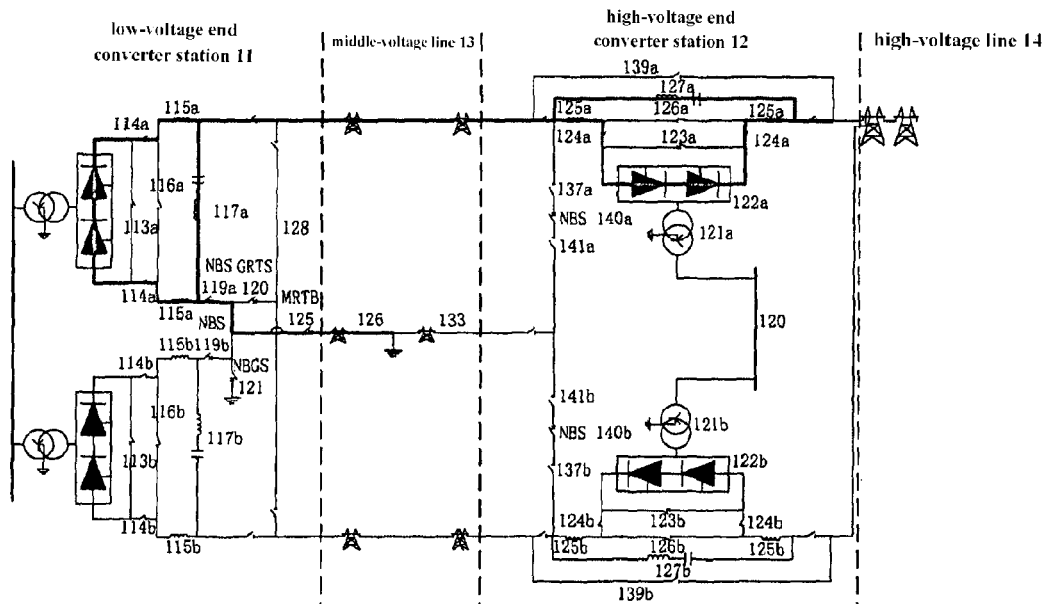
FIG. 29 shows the full monopole grounding return wiring of the cascaded converter station of the fourth embodiment of this invention.

FIG. 29 shows the full monopole grounding return wiring mode, in which the low-voltage end converter valve 112b and the high-voltage end converter valve 122b of the positive pole quit operation, while the low-voltage end converter valve 112a and the high-voltage end converter valve 122a of the negative pole keep in operation.

Figure 30A:
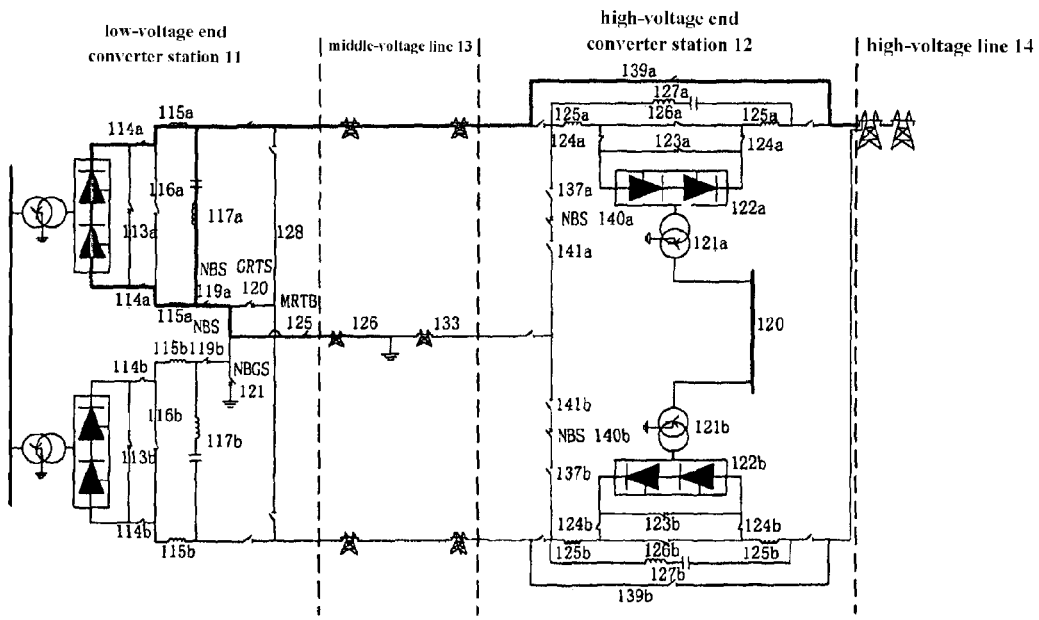
FIG. 30A and FIG. 30B show the ½ monopole grounding return wiring of the cascaded converter station of the fourth embodiment of this invention.
Figure 30B:
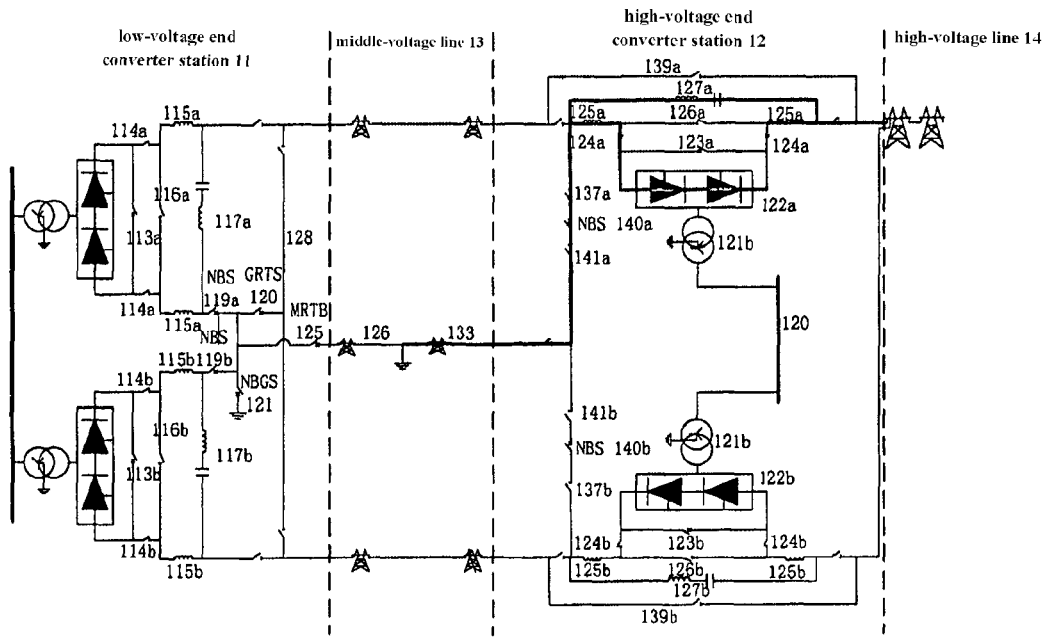

FIG. 30A and FIG. 30B show the ½ monopole grounding return wiring mode.

FIG. 30A shows a schematic diagram of the operation wiring when the converter valves 122a and 122b of the high-voltage end converter station 12 quit operation, while only the converter valve 112a of the negative pole in the low-voltage end converter station 11 keeps in operation. As shown in FIG. 30A, when the high-voltage end converter station 122a quits operation, a return loop is formed through the bypass path 139a and the grounding line 126, and the smoothing reactors 125a, etc. are not connected in the operation circuit.

FIG. 30B shows a schematic diagram of the operation wiring when the converter valves 112a and 112b of the low-voltage end converter station 11 quit operation, while only the converter valve 122a of the negative pole in the high-voltage end converter station 12 keeps in operation.

Figure 31:
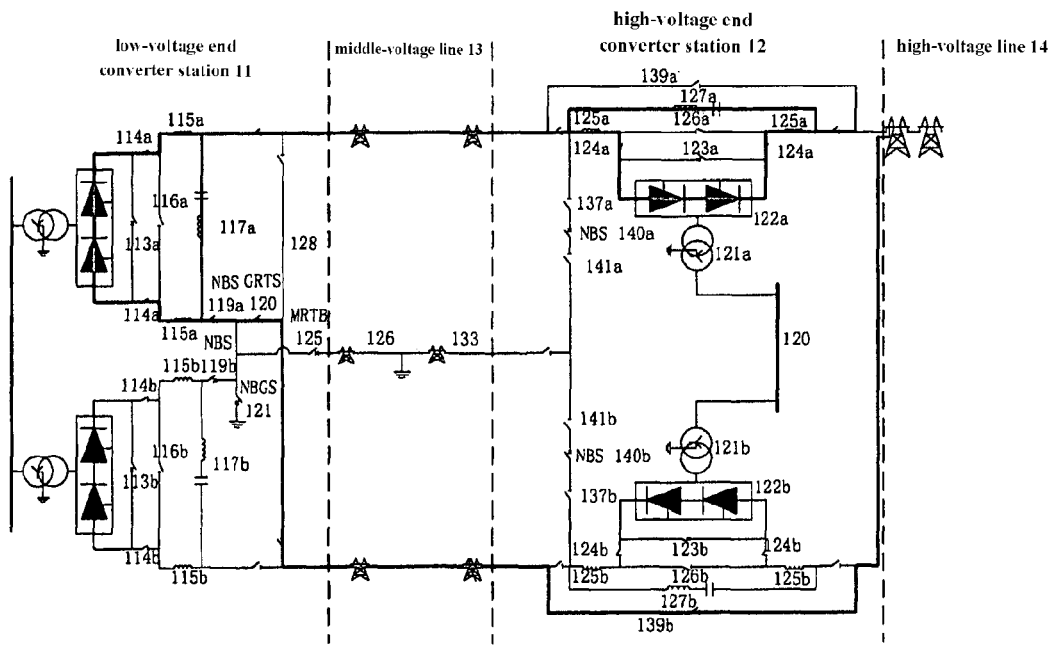
FIG. 31 shows the full monopole metal return wiring of the cascaded converter station of the fourth embodiment of this invention.

FIG. 31 shows the full monopole metal return wiring, in which the low-voltage end converter valve 112b and the high-voltage end converter valve 122b of the positive pole quit operation, while the low-voltage end converter valve 112a and the high-voltage end converter valve 122a of the negative pole keep in operation. As shown in FIG. 31, when the high-voltage end converter valve 122b quits operation, a return loop is formed through the bypass path 139b and the metal return line 128, and the smoothing reactors 125b, etc. are not connected in the operation circuit.

Figure 32A:
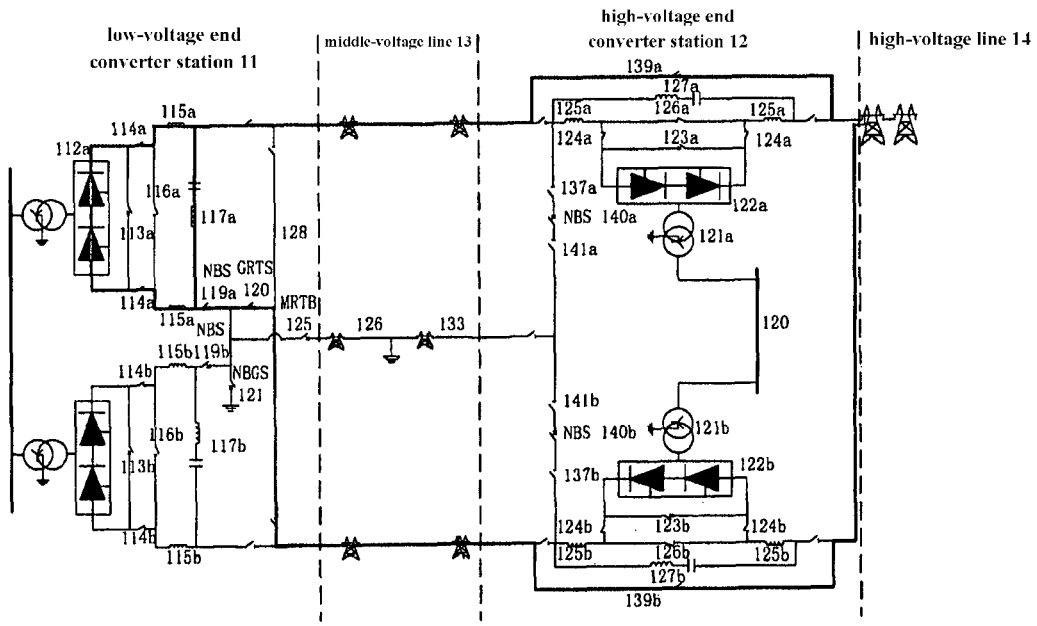
FIG. 32A and FIG. 32B show the ½ monopole metal return wiring of the cascaded converter station of the fourth embodiment of this invention.
Figure 32B:
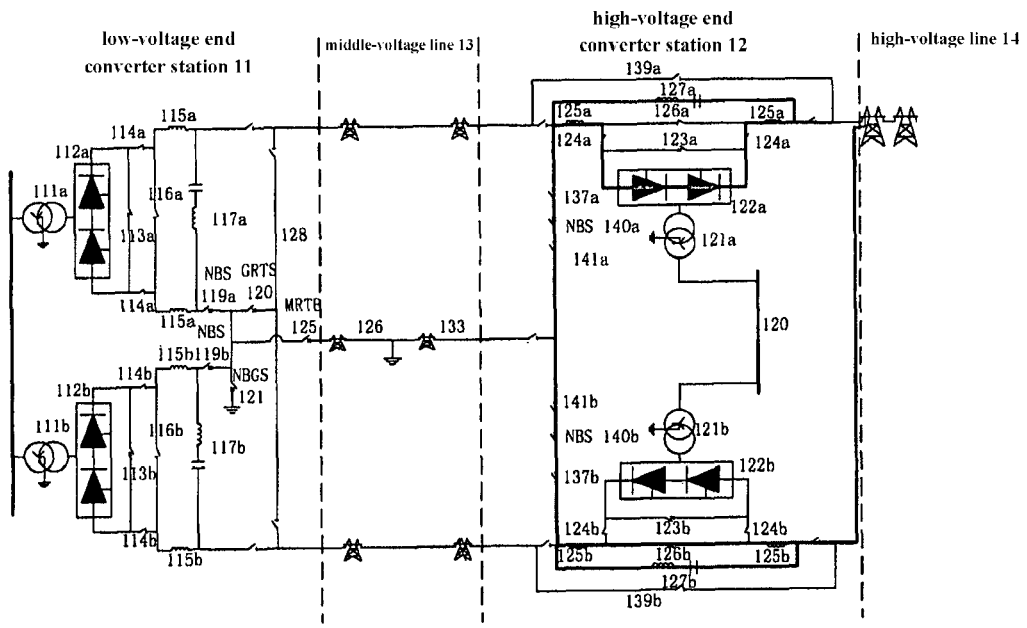

FIG. 32A and FIG. 32B show the ½ monopole metal return wiring. FIG. 32A shows a schematic diagram of the operation wiring when the converter valves 122a and 122b of the high-voltage end converter station 12 quit operation, while only the converter valve 112a of the negative pole in the low-voltage end converter station 11 keeps in operation. As shown in FIG. 32A, when the high-voltage end converter station 122a and 122b quit operation, a return loop is formed through the bypass paths 139a, 139b and the metal return line 128, and the smoothing reactors 125a and 125b, etc. are not connected in the operation circuit.

FIG. 32B shows a schematic diagram of the operation wiring when the converter valves 112a and 112b of the low-voltage end converter station 11 quit operation, while only the converter valve 122a of the negative pole in the high-voltage end converter station 12 keeps in operation.

The advantage of the fourth embodiment is that the low-voltage end converter station 11 and the high-voltage end converter station 12 can operate independently without interference with each other (for example, in converter station overhauling), so that energy availability can be improved. When a failure occurs on the smoothing reactors and the DC filter of the high-voltage end converter station 12, the converter station of the low-voltage end converter station 11 of the same pole can operate continuously, without one pole interruption.

Figure 33:
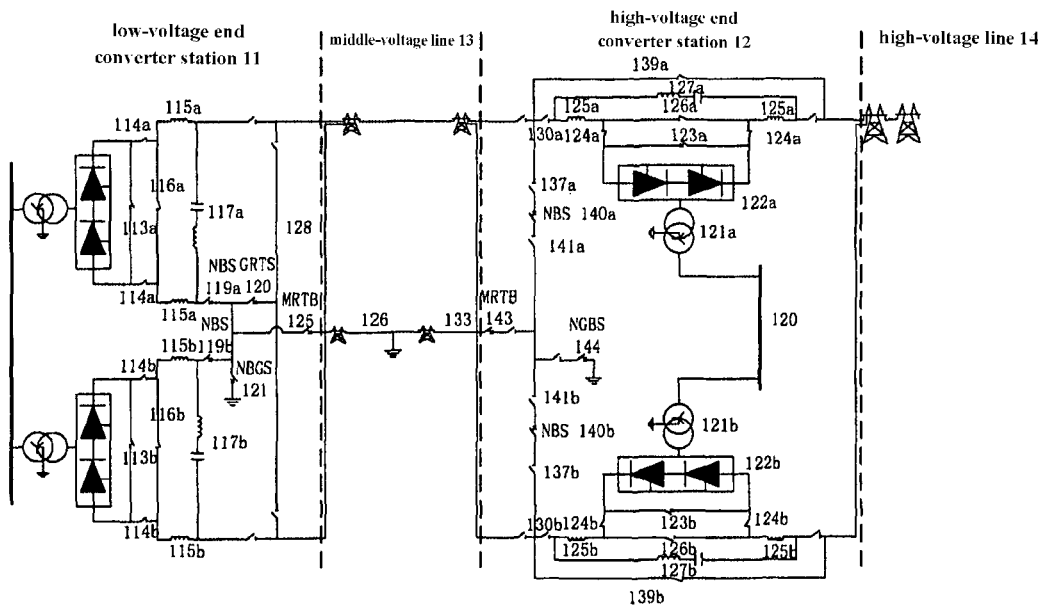
FIG. 33 shows a first expanded wiring scheme of the cascaded converter station of the fourth embodiment of this invention.
Figure 34:
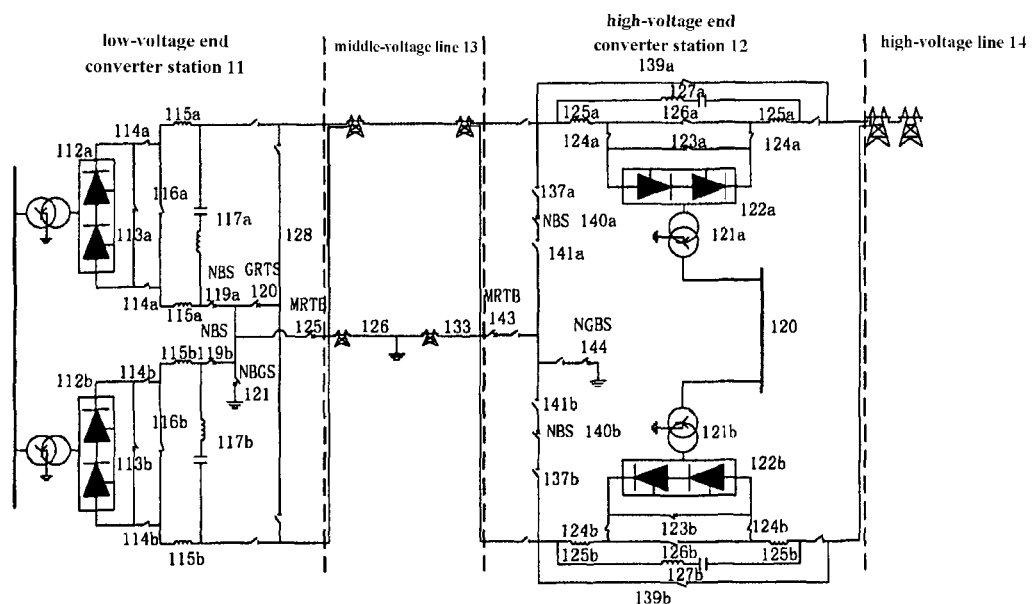
FIG. 34 shows a second expanded wiring scheme of the cascaded converter station of the fourth embodiment of this invention.

Based on the wiring scheme of the cascaded converter station of the fourth embodiment, other expanded wiring schemes may be further obtained, as shown in FIG. 33 and FIG. 34.

FIG. 33 shows a first expanded wiring scheme based on the above embodiment, in which MRTB 143 and NBGS 144 are installed in the grounding line of the high-voltage end converter station 12, and isolation knife switches 130a, 130b are provided near the smoothing reactors. According to this wiring scheme, online switching between the monopole grounding return mode and the monopole metal return mode of the high-voltage end converter station 12 can be achieved without passing through the smoothing reactors of the other converter station, and double pole operation can be achieved using a converter station temporal grounding.

FIG. 34 shows a second expanded wiring scheme based on the above embodiment, in which MRTB 143 and NBGS 144 are installed in the grounding line of the high-voltage end converter station 12. According to this wiring scheme, online switching between the monopole grounding return mode and the monopole metal return mode of the high-voltage end converter station 12 can be achieved, and double pole operation can be achieved using a converter station temporal grounding. Different to FIG. 33, no isolation knife switches 130a and 130b are provided near the smoothing reactors, in the monopole metal operation of a pole's converter station, a smoothing reactor branch of the other converter station is required.

Figure 35:
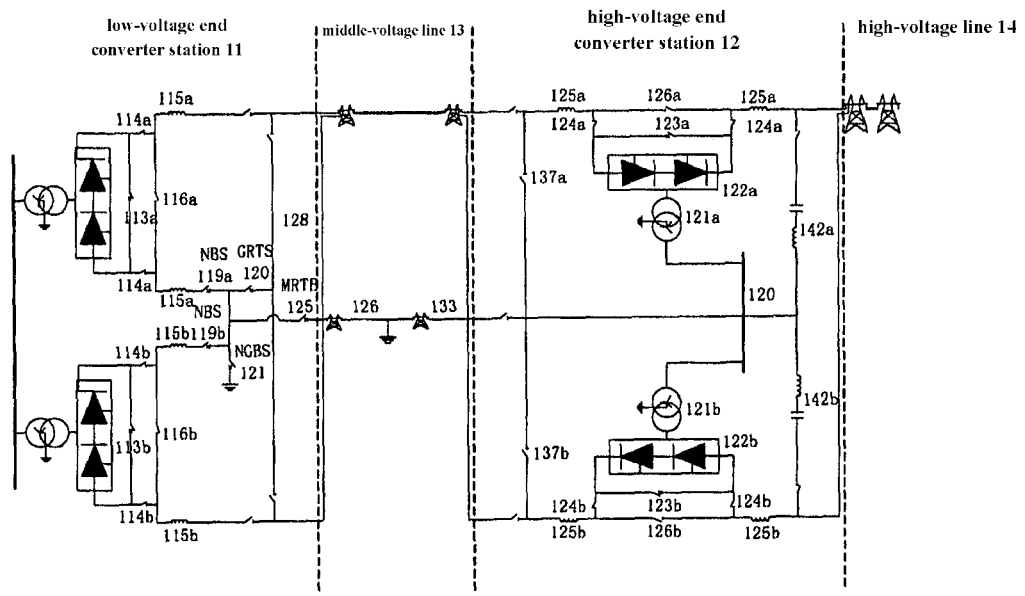
FIG. 35 shows an optional DC filter configuration.
Figure 36:
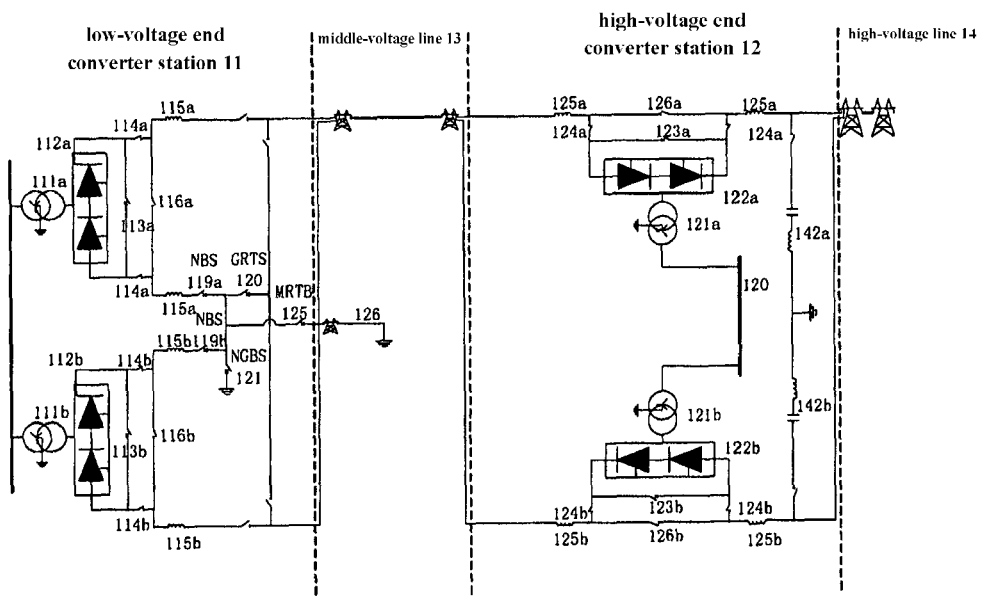
FIG. 36 shows another optional DC filter configuration.
Figure 37:
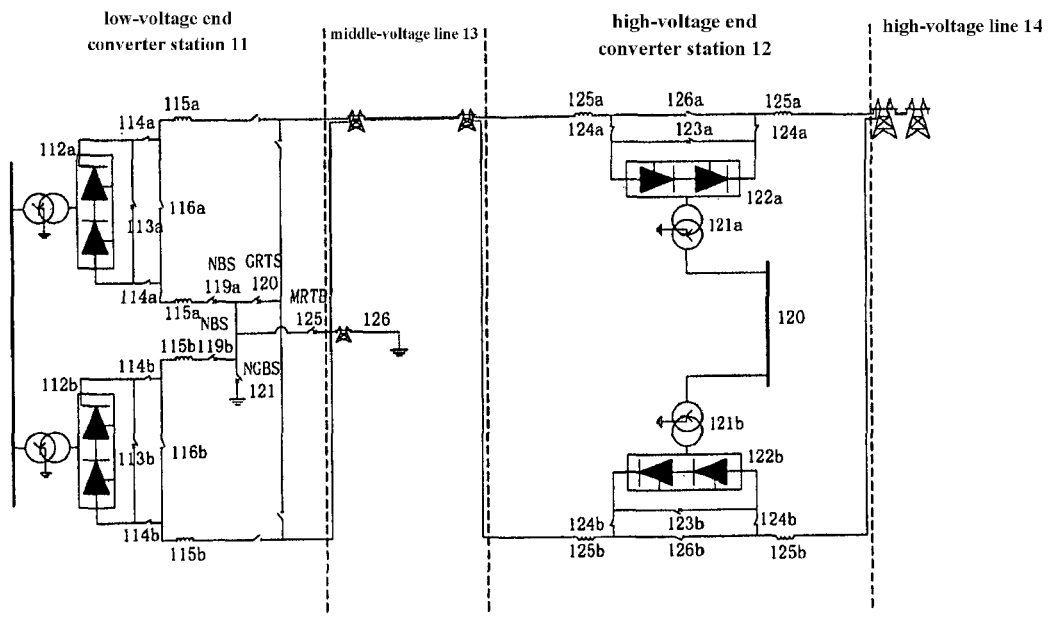
FIG. 37 shows still another optional DC filter configuration.

In the cascaded converter stations of the first to fourth embodiments and their expanded structures combination with FIGS. 1-34, DC filters are connected across the two ends of the smoothing reactors in the low-voltage end converter station 11 and the high-voltage end converter station 12. However, this DC filter configuration is merely a preferable scheme but not a limitation. FIGS. 35-37 show other three alternative DC filter configurations, which may be combined with various wiring manners of the cascaded converter stations of the first to third embodiments shown in FIG. 1 to FIG. 34 appropriately (to substitute the DC filters therein). When selecting a wiring scheme for a cascaded multi-terminal HVDC power transmission system, a DC filter configuration can be selected reasonably according to project requirements on equivalent interference current.

Equivalent interference current is defines as: a single-frequency harmonic current, which produces the same interference effect on adjacent parallel or crossed communication lines as the combined interference effect produced by harmonic currents of all frequencies on a line. According to particular project requirements, the threshold of equivalent interference current may be adjusted appropriately, to balance the cost of harmonic management and the cost of harmonic interference compensation, so as to minimize the harmonic management and compensation costs.

There are three following situations:

(1) In the case that it is required to meet a standard about equivalent interference current all along the line, the DC filter is connected across the two ends of the smoothing reactors in a converter station-dependent configuration as shown in FIGS. 1-34;

(2) in the case of permitting substandard equivalent interference current on the 400 kV middle-voltage line, DC filters 142a, 142b to the ground can be provided in the high-voltage end converter station 12, and DC filters across converter stations can be canceled, as shown in FIG. 35 and FIG. 36. FIG. 35 shows a situation that has a grounding line 133 provided in the high-voltage end converter station 12. FIG. 36 shows a situation that does not have grounding line 133 provided in the high-voltage end converter station 12. In this case, harmonic current produced by the converter returns through the grounding grid of the high-voltage end converter station 12 via the grounding electrode of the low-voltage end converter station 11;

(3) in the case of permitting substandard equivalent interference current all along the line, the DC filters can be canceled as shown in FIG. 37.

Figure 38:
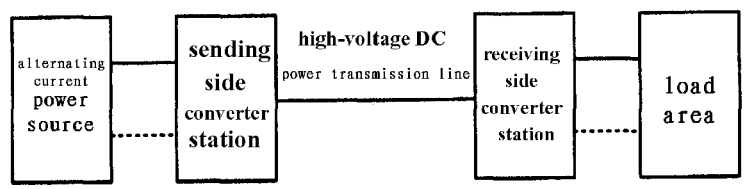
FIG. 38 shows a cascaded multi-terminal HVDC power transmission system according to this invention.

A cascaded multi-terminal HVDC power transmission system is further provided in this invention. As shown in FIG. 38, the system comprises a converter station on the sending side, a converter station on the receiving side, and a HVDC power transmission line therebetween. The converter station on the sending side and the converter station on the receiving side connected to an AC power source and a load area respectively. Wherein, one or both of the converter station on the sending side and the converter station on the receiving side is constructed according to the cascaded converter station of the first to fourth embodiments described above. Correspondingly, the AC power source and the load area may comprise one or more AC power sources and load areas.

Note that, in this description, for example, the value of high voltage direct voltage, the number of isolation knife switches and the type of converter station are all illustrative. Those skilled in the art may make modifications thereto according to practical project requirements. In addition, the terms "first", "second", etc. in this description are merely used to distinguish one entity or operation from another entity or operation, and it is not necessary to require or imply any such specific relationship or sequence of those entities or operations. In addition, the terms "comprise," "include," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus. In the case of without a further limitation, the expression "comprising an element" does not preclude the addition of other identical elements in the process, method, article, or apparatus comprising that element.

Preferred embodiments of this invention have been described above with reference to drawings. It is apparent that, however, those embodiments are merely for the purpose of illustration, but are not intended to be limitations on the scope of this invention. Those skilled in the art may make various modifications, substitutions and improvements to those embodiments without departing from the spirit and scope of this invention. The scope of this invention is only defined by the accompanying claims.

What is claimed is:

1. A cascaded converter station used in cascaded multi-terminal HVDC power transmission, comprising a low-voltage end converter station and a high-voltage end converter station, wherein, the low-voltage end converter station has a first positive side and a first negative side, each of the first positive side and the first negative side comprising:

(i) a first converter transformer coupled to a first alternating current (AC) network;

(ii) a first converter valve coupled to the first converter transformer for realizing DC/AC conversion; and (iii) two first smoothing reactors, wherein each of the two first smoothing reactors is provided on each of both ends of each first converter valve;

wherein the high-voltage end converter station is connected in series to the low-voltage end converter station through a middle-voltage DC power transmission line, and is connected to a high-voltage DC power transmission line, wherein the high-voltage end converter station comprises a second positive side and a second negative side, each of the second positive side and the second negative side comprising:

(i) a second converter transformer coupled to a second alternating current (AC) network;

(ii) a second converter valve coupled to the second converter transformer for realizing DC/AC conversion; and (iii) two second smoothing reactors, wherein each of the two second smoothing reactor is provided on each of both ends of each second converter valve;

wherein a grounding line coupled to a grounding electrode and a metal return line coupled between a positive line and a negative line are provided in the low-voltage end converter station.

2. The cascaded converter station according to claim 1, wherein in each of the low-voltage end converter station and the high-voltage end converter station, a first DC filter is connected across the two first smoothing reactors, and a second DC filter is connected across the two second smoothing reactors.

3. The cascaded converter station according to claim 1, wherein a DC filter to ground is provided in the high-voltage end converter station.

4. The cascaded converter station according to claim 1, wherein in of the low-voltage end converter station, a first bypass isolation knife switch is provided between the first smoothing reactors of each of the first positive side and the first negative side, and in the high-voltage end converter station, a second bypass isolation knife switch is provided between the second smoothing reactors of each of the second positive side and the second negative side.

5. A cascaded converter station used in cascaded multi-terminal HVDC power transmission, comprising a low-voltage end converter station and a high-voltage end converter station, wherein,
the low-voltage end converter station comprises a first positive side and a first negative side, each of the first positive side and the first negative side comprising:
(i) a first converter transformer coupled to a first alternating current (AC) network;
(ii) a first converter valve coupled to the first converter transformer for realizing DC/AC conversion; and
(iii) two first smoothing reactors, wherein each of the two first smoothing reactors is provided on each of both ends of each first converter valve;
wherein the high-voltage end converter station is connected in series to the low-voltage end converter station through a middle-voltage DC power transmission line, and is connected to a high-voltage DC power transmission line, wherein the high-voltage end converter station comprises a second positive side and a second negative side, each of the second positive side and the second negative side comprising:
(i) a second converter transformer coupled to a second alternating current (AC) network;
(ii) a second converter valve coupled to the second converter transformer for realizing DC/AC conversion; and
(iii) two second smoothing reactors, wherein each of the two second smoothing reactors is provided on each of both ends of each second converter valve;
wherein, a grounding line coupled to a grounding electrode and a metal return line coupled between a positive line and a negative line are provided in the low-voltage end converter station, and a grounding line coupled to the grounding electrode and a neutral bus isolation knife switch are provided in the high-voltage end converter station.

6. The cascaded converter station according to claim 5, wherein a metal return line coupled between the positive line and the negative line is further provided in the high-voltage end converter station.

7. The cascaded converter station according to claim 5, wherein a path for bypassing the high-voltage end converter station is coupled between the middle-voltage DC power transmission line and the high-voltage DC power transmission line.

8. The cascaded converter station according to claim 1, wherein in each of the low-voltage end converter station and the high-voltage end converter station, a first DC filter is connected across the two first smoothing reactors, and a second DC filter is connected across the two second smoothing reactors.

9. The cascaded converter station according to claim 5, wherein a DC filter to ground is provided in the high-voltage end converter station.

10. The cascaded converter station according to claim 5, wherein in the low-voltage end converter station, a first bypass isolation knife switch is provided between the first smoothing reactors of each of the first positive side and the first negative side, and in the high-voltage end converter station, a second bypass isolation knife switch is provided between the second smoothing reactors of each of the second positive side and the second negative side.

11. A cascaded converter station used in cascaded multi-terminal HVDC power transmission, comprising a low-voltage end converter station and a high-voltage end converter station, wherein,
the low-voltage end converter station comprises a first positive side and a first negative side, each of the first positive side and the first negative side comprising:
(i) a first converter transformer coupled to a first alternating current (AC) network;
(ii) a first converter valve coupled to the first converter transformer for realizing DC/AC conversion; and
(iii) two first smoothing reactors, wherein each of the two first smoothing reactors is provided on each of both ends of each first converter valve;
wherein the high-voltage end converter station is connected in series to the low-voltage end converter station through a middle-voltage DC power transmission line, and is connected to a high-voltage DC power transmission line, wherein the high-voltage end converter station comprises a second positive side and a second negative side, each of the second positive side and the second negative side comprising:
(i) a second converter transformer coupled to a second alternating current (AC) network;
(ii) a second converter valve coupled to the second converter transformer for realizing DC/AC conversion; and
(iii) two second smoothing reactors, wherein each of the two second smoothing reactors is provided on each of both ends of each second converter valve;
wherein a grounding line coupled to the grounding electrode and a metal return line coupled between a positive line and a negative line are provided in the low-voltage end converter station; a grounding line coupled to the grounding electrode and a neutral bus switch and a neutral bus isolation knife switch are provided in the high-voltage end converter station.

12. The cascaded converter station according to claim 11, wherein a metal return line coupled between the positive line and the negative line is further provided in the high-voltage end converter station.

13. The cascaded converter station according to claim 11, wherein in each of the low-voltage end converter station and the high-voltage end converter station, a first DC filter is connected across the two first smoothing reactors, and a second DC filter is connected across the two second smoothing reactors.

14. The cascaded converter station according to claim 11, wherein a DC filter to ground is provided in the high-voltage end converter station.

15. The cascaded converter station according to claim 11, wherein in the low-voltage end converter station, a first bypass isolation knife switch is provided between the first smoothing reactors of each of the first positive side and the first negative side, and in the high-voltage end converter station, a second bypass isolation knife switch is provided between the second smoothing reactors of each of the second positive side and the second negative side.

16. A cascaded converter station used in cascaded multi-terminal HVDC power transmission, comprising a low-voltage end converter station and a high-voltage end converter station, wherein,
the low-voltage end converter station comprises a first positive side and a first negative side, each of the first positive side and the first negative side comprising:

(i) a first converter transformer coupled to a first alternating current (AC) network;
(ii) a first converter valve coupled to the first converter transformer for realizing DC/AC conversion; and
(iii) two first smoothing reactors, wherein each of the two first smoothing reactors is provided on each of both ends of each first converter valve;

wherein the high-voltage end converter station is connected in series to the low-voltage end converter station through a middle-voltage DC power transmission line, and is connected to a high-voltage DC power transmission line, wherein the high-voltage end converter station comprises a second positive side and a second negative side, each of the second positive side and the second negative side comprising:
(i) a second converter transformer coupled to a second alternating current (AC) network;
(ii) a second converter valve coupled to the second converter transformer for realizing DC/AC conversion; and
(iii) two second smoothing reactors, wherein each of the two second smoothing reactors is provided on each of both ends of each second converter valve;

wherein a grounding line coupled to the grounding electrode and a metal return line coupled between a positive line and a negative line are provided in the low-voltage end converter station; a grounding line coupled to the grounding electrode, a neutral bus switch, and a neutral bus isolation knife switch are provided in the high-voltage end converter station, and a path for bypassing the high-voltage end cascaded converter station is coupled between the middle voltage DC power transmission line and the high voltage DC power transmission line.

17. The cascaded converter station according to claim 16, wherein a metal return transfer switch and a neutral bus grounding switch are provided in the high-voltage end converter station.

18. The cascaded converter station according to claim 16, wherein in each of the low-voltage end converter station and the high-voltage end converter station, a first DC filter is connected across the two first smoothing reactors, and a second DC filter is connected across the two second smoothing reactors.

19. The cascaded converter station according to claim 16, wherein a DC filter to ground is provided in the high-voltage end converter station.

20. The cascaded converter station according to claim 16, wherein in the low-voltage end converter station, a first bypass isolation knife switch is provided between the first smoothing reactors of each of the first positive side and the first negative side, and in the high-voltage end converter station, a second bypass isolation knife switch is provided between the second smoothing reactors of each of the second positive side and the second negative side.

21. A cascaded multi-terminal HVDC power transmission system, comprising: a sending side converter station, a receiving side converter station, and a high-voltage DC power transmission line therebetween, wherein at least one of the sending side converter station and the receiving side converter station is constructed according to the cascaded converter station of claim 1.

* * * * *